US010826159B2

(12) United States Patent
Kim et al.

(10) Patent No.: US 10,826,159 B2
(45) Date of Patent: Nov. 3, 2020

(54) ELECTRONIC DEVICE INCLUDING ANTENNA

(71) Applicant: Samsung Electronics Co., Ltd., Suwon-si (KR)

(72) Inventors: Gyu Sub Kim, Seoul (KR); Jin Woo Jung, Seoul (KR); Byoung Ryoul Song, Suwon-si (KR); Sin Hyung Jeon, Suwon-si (KR); So Young Lee, Gwacheon-si (KR); Jae Bong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/977,551

(22) Filed: May 11, 2018

(65) Prior Publication Data

US 2018/0331418 A1    Nov. 15, 2018

(30) Foreign Application Priority Data

May 12, 2017    (KR) .......................... 10-2017-0059451

(51) Int. Cl.
*H01Q 1/24*  (2006.01)
*H01Q 21/28* (2006.01)
(Continued)

(52) U.S. Cl.
CPC ....... *H01Q 1/243* (2013.01); *B29C 45/14655* (2013.01); *H01Q 1/38* (2013.01);
(Continued)

(58) Field of Classification Search
CPC .... B29C 45/14655; H01Q 1/24; H01Q 1/243; H01Q 1/38; H01Q 21/28; H01Q 9/04; H01Q 9/0414; H01Q 9/42
See application file for complete search history.

(56) References Cited

U.S. PATENT DOCUMENTS

| 8,203,491 | B2 * | 6/2012 | Yang ........................ H01Q 1/40 343/700 MS |
| 8,364,212 | B2 * | 1/2013 | Waku ..................... H01Q 1/243 455/347 |

(Continued)

FOREIGN PATENT DOCUMENTS

| CN | 104079313 A | 10/2014 |
| CN | 105873388 A | 8/2016 |
| CN | 105892570 A | 8/2016 |

OTHER PUBLICATIONS

European Search Report dated Aug. 28, 2018; Reference #: P256685EP/PXC; Application #: 18171880.0-1205.
(Continued)

*Primary Examiner* — Tho G Phan
(74) *Attorney, Agent, or Firm* — Jefferson IP Law, LLP

(57) ABSTRACT

An electronic device is provided. The electronic device includes a front glass plate, a back glass plate, and a side member including a conductive portion, at least one conductive pattern formed on an edge portion of the front glass plate, a wireless communication circuit positioned inside a housing and electrically connected to the conductive portion and the at least one conductive pattern. In addition, various embodiments understood through the disclosure may be provided.

13 Claims, 19 Drawing Sheets

(51) Int. Cl.
*H01Q 9/42* (2006.01)
*B29C 45/14* (2006.01)
*H01Q 1/38* (2006.01)
*H01Q 9/04* (2006.01)

(52) U.S. Cl.
CPC ............. *H01Q 9/0414* (2013.01); *H01Q 9/42* (2013.01); *H01Q 21/28* (2013.01)

(56) References Cited

U.S. PATENT DOCUMENTS

| | | |
|---|---|---|
| 9,153,856 B2 | 10/2015 | Rappoport et al. |
| 9,454,179 B2 | 9/2016 | Shin et al. |
| 9,513,668 B2 | 12/2016 | Shin et al. |
| 9,557,770 B2 | 1/2017 | Shin et al. |
| 9,578,149 B2 | 2/2017 | Moon et al. |
| 9,857,836 B2 | 1/2018 | Shin et al. |
| 9,886,056 B2 | 2/2018 | Shin et al. |
| 9,904,317 B2 | 2/2018 | Shin et al. |
| 10,019,032 B2 | 7/2018 | Shin et al. |
| 10,096,888 B2 * | 10/2018 | Ahn ................ H01Q 9/0414 |
| 10,403,964 B2 | 9/2019 | Yoo et al. |
| 10,446,910 B2 * | 10/2019 | Han ................ H01Q 1/48 |
| 2011/0287812 A1 | 11/2011 | Joo |
| 2013/0076573 A1 | 3/2013 | Rappoport et al. |
| 2015/0245513 A1 | 8/2015 | Moon |
| 2015/0331451 A1 | 11/2015 | Shin et al. |
| 2015/0334211 A1 | 11/2015 | Shin et al. |
| 2016/0087329 A1 | 3/2016 | Rappoport et al. |
| 2016/0111789 A1 | 4/2016 | Chang et al. |
| 2016/0195895 A1 | 7/2016 | Shin et al. |
| 2016/0195896 A1 | 7/2016 | Shin et al. |
| 2016/0195900 A1 | 7/2016 | Shin et al. |
| 2016/0198037 A1 | 7/2016 | Shin et al. |
| 2016/0233573 A1 | 8/2016 | Son et al. |
| 2016/0234362 A1 | 8/2016 | Moon et al. |
| 2017/0060182 A1 | 3/2017 | Shin et al. |
| 2017/0149940 A1 | 5/2017 | Moon et al. |
| 2018/0181163 A1 | 6/2018 | Shin et al. |

OTHER PUBLICATIONS

European Search Office Action dated Jun. 25, 2019, issued in European Application No. 18171880.0.
Indian Office Action dated Dec. 31, 2019; Indian Appln. No. 201814017688.
Chinese Office Action with English translation dated Jan. 6, 2020; Chinese Appln. No. 201810453113.5.

* cited by examiner

ELECTRONIC DEVICE INCLUDING ANTENNA

CROSS-REFERENCE TO RELATED APPLICATION(S)

This application is based on and claims priority under 35 U.S.C. § 119(a) of a Korean patent application number 10-2017-0059451, filed on May 12, 2017, in the Korean Intellectual Property Office, the disclosure of which is incorporated by reference herein its entirety.

TECHNICAL FIELD

The disclosure relates to an antenna capable of performing wireless communication with an external device and an electric device including the same.

BACKGROUND

An electronic device, such as a smartphone, a tablet personal computer (PC), or the like may transmit/receive various data to/from an external device through wireless communication. The electronic device may perform long distance communication (e.g., mobile communication, such as voice call or wireless data communication), short range communication (e.g., Bluetooth, Wi-Fi communication), proximity communication (e.g., wireless payment, wireless charging, near field communication (NFC), or the like), or the like, through an antenna.

In recent years, an electronic device provides a broadband communication service by using a metal frame included in a part of an external housing as an antenna or by using a film-type or print-type antenna formed on a back cover surface. The metal frame is separated using a segment formed of an insulating material such that the metal frame has an electrical length required for wireless communication.

The above information is presented as background information only to assist with an understanding of the disclosure. No determination has been made, and no assertion is made, as to whether any of the above might be applicable as prior art with regard to the disclosure.

SUMMARY

An electronic device according to the related art arranges an antenna on a part of a front or rear surface thereof. The electronic device may be provided in the antenna area of a metal housing or a back cover with an additional antenna pattern such that an additional signal is transmitted and received.

Recently, as the display is expanded to occupy most of the front surface of the electronic device, the area for arranging the antenna is reduced. When the display area is expanded to the front surface, it may be difficult to secure the middle band antenna performance and performance deterioration may occur due to the narrow band antenna configuration. Further, it may be difficult to arrange the antennas on the left and right side surfaces of the electronic device due to interference with the antenna arranged in the lower end metal housing of the electronic device, overlapping of the display ground area, and the like.

Aspects of the disclosure are to address at least the above-mentioned problems and/or disadvantages and to provide at least the advantages described below. Accordingly, an aspect of the disclosure is to provide an antenna including a conductive portion on a side portion thereof and an electronic device including the same.

In accordance with an aspect of the disclosure, an electronic device is provided. The electronic device includes a housing including a front glass plate, a back glass plate, and a side member surrounding a space between the front and back glass plates and including a conductive portion, the front glass plate having a rectangular shape including a first side, a second side, a third side and a fourth side when viewed from above the front glass plate, wherein the first and second sides have lengths shorter than lengths of the third and fourth sides, and wherein the first side of the front glass plate includes a first edge portion which is curved toward the back glass plate when viewed in cross-section cut in a direction perpendicular to the first side, a touch screen display exposed through a portion of the front glass plate, at least one first conductive pattern positioned inside the housing and formed along an inner surface of the first edge portion, a wireless communication circuit positioned inside the housing and electrically connected to the conductive portion and the at least one first conductive pattern, and a processor electrically connected to the touch screen display and the wireless communication circuit.

In accordance with another aspect of the disclosure, an electronic device is provided. The electronic device includes a housing including a first surface facing a first direction, a second surface facing the first surface, and a side member arranged in a space between the first and second surfaces and including a conductive portion extending along a portion, wherein the housing includes a curved portion formed from the first surface toward the side member when viewed in cross-section cut in a direction perpendicular to a portion of the side member, a conductive pattern formed at least inside the curved portion, wherein a portion of the conductive pattern is formed along the conductive portion, an insulating material arranged between the first surface and the side member to physically separate the conductive pattern from the conductive portion, and a wireless communication circuit located inside the housing to transmit an electrical signal to at least one of the conductive portion and the conductive pattern.

According to the various embodiments of the disclosure, even if the display of the electronic device is expanded on the front surface thereof, the electrical length for transmitting/receiving a target frequency signal may be secured by using the side member.

According to the various embodiments of the disclosure, even if the display of the electronic device is expanded to the front surface thereof, the degradation in communication performance due to interference with the display may be mitigated.

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
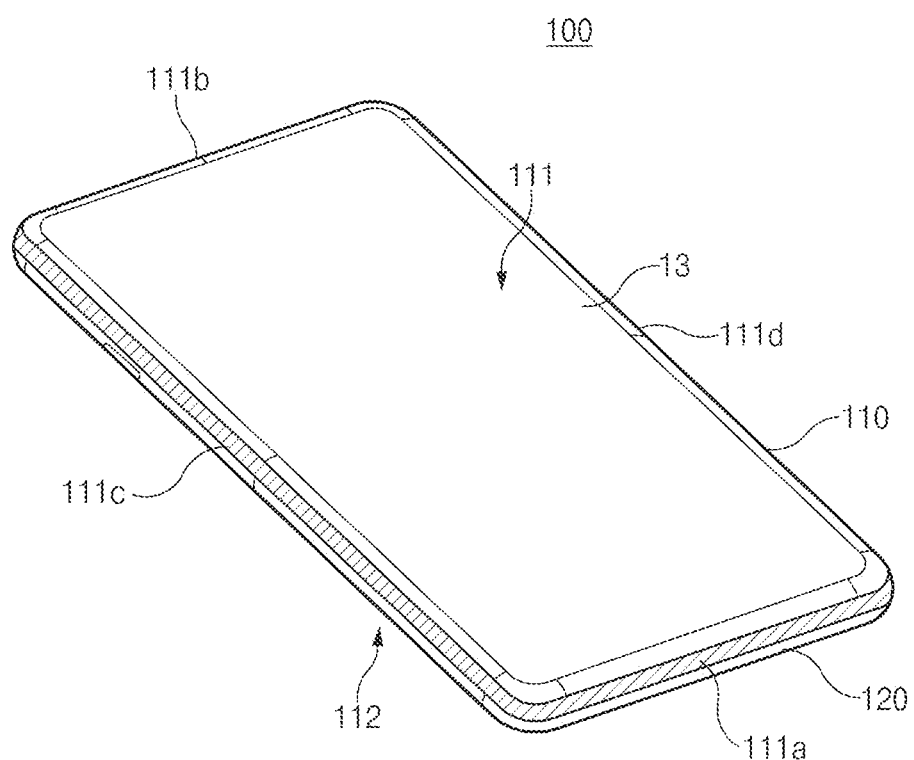
FIG. 1 is a view illustrating an electronic device performing wireless communication according to an embodiment of the disclosure.

FIG. 1 illustrates an electronic device performing wireless communication according to various embodiments of the disclosure.

Referring to FIG. 1, according to various embodiments of the disclosure, an electronic device 100 may be a device, such as a smartphone, a tablet PC, or the like. The electronic device 100 may transmit/receive a signal to an external device through various communication schemes, such as long distance communication, short range communication, proximity communication, or the like. The electronic device 100 may employ various antennas to communicate with an external device through the communication schemes.

The electronic device 100 may include a display 13 and a housing 110. The display 13 may output various contents provided to a user. The display 13 may include a touch screen display used for receiving a user input through a touch input.

According to various embodiments of the disclosure, the housing 110 may protect the display 13, an internal circuit, and the like. To drive the display 13 and the electronic device 100, a processor, a module, an antenna, a circuit board, a communication circuit, or the like may be mounted in the housing 110. According to various embodiments of the disclosure, the housing 110 may include a first surface 111 (e.g., a front surface) on which the display 13 is arranged, a second surface 112 (e.g., a rear surface) facing the first surface 111, and a side surface surrounding a space between the first and second surfaces 111 and 112.

According to various embodiments of the disclosure, the housing 110 may, for example, be formed in a generally rectangular shape when viewed from above the first face 111 and at least a portion of a side thereof may be rounded. At least one of sides of the housing 110 may be formed in a gradually curved shape (e.g., an edge type) toward the edge. The housing 110 may include first and second sides 111a and 111b extending in a first direction (e.g., +x or −x) when viewed from above the first surface 111, and third and fourth sides 111c and 111d extending in a second direction (e.g., +y or −y) and having lengths longer than those of the first and second sides 111a and 111b.

The electronic device 100 may be implemented such that the display 13 extends to at least one of the first and second sides 111a and 111b. For example, the display 13 may be implemented in the form of a full screen.

According to various embodiments of the disclosure, the housing 110 may include a side member 120 provided in at least a space between the first and second surfaces 111 and 112. According to an embodiment, the side member 120 may be arranged adjacent to the first side 111a. For example, the first side 111a may be located at a lower end of the first surface 111 when viewed from the first surface 111.

At least a portion of the side member 120 may include a conductive portion. For example, the conductive portion may be a metal frame. The conductive portion may be connected to a substrate, a communication circuit, and the like in the housing 110.

Figure 2:
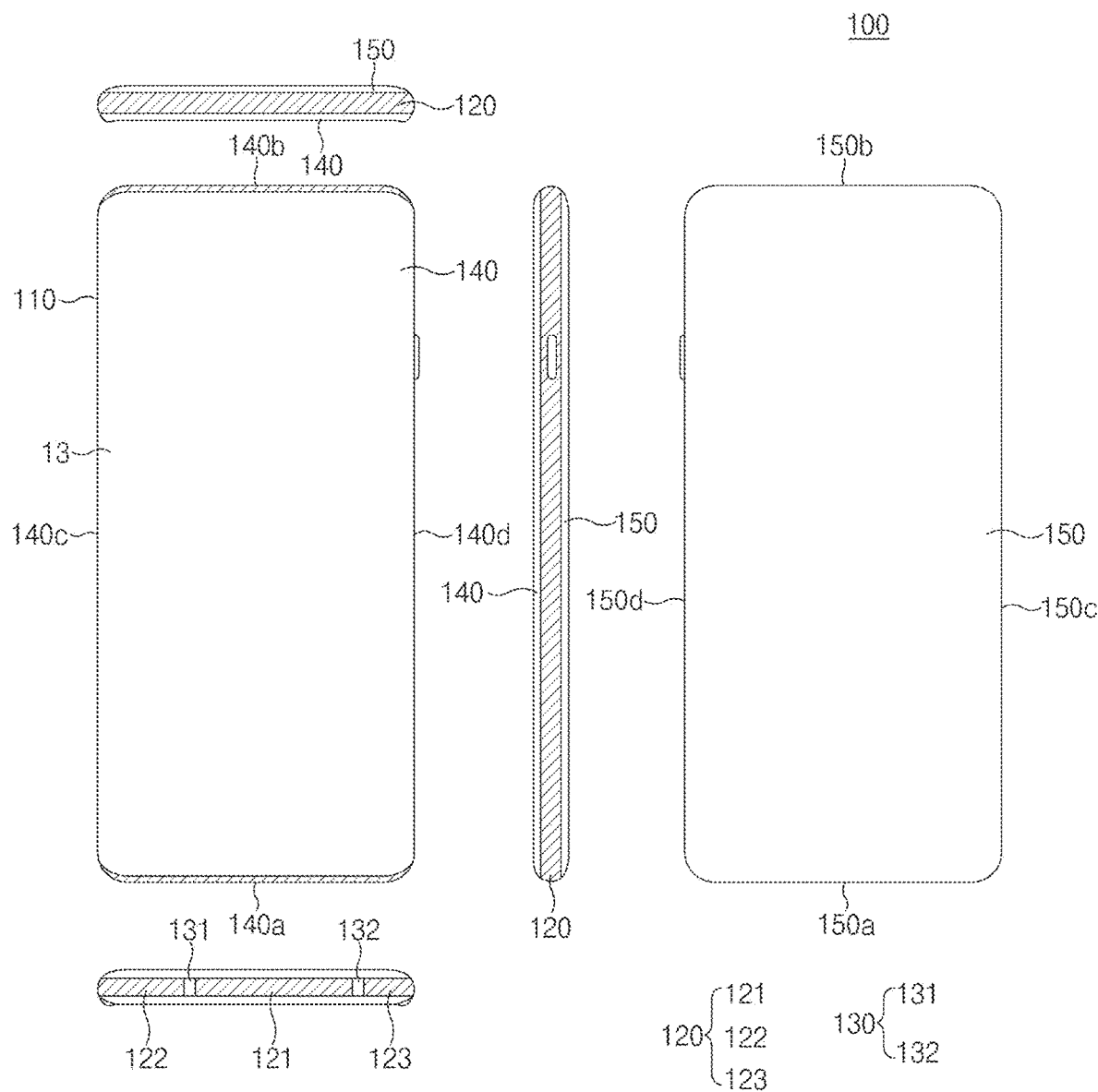
FIG. 2 is a view illustrating an appearance of an electronic device according to an embodiment of the disclosure.

FIG. 2 illustrates an appearance of an electronic device according to an embodiment of the disclosure.

Referring to FIG. 2, according to an embodiment of the disclosure, the electronic device 100 (e.g., the electronic device 100 of FIG. 1) may include the side member 120, a front plate 140 and a back plate 150.

According to an embodiment of the disclosure, the front plate 140 may have a quadrangular shape, such as a rectangular shape when viewed from above the front plate 140. According to an embodiment of the disclosure, the front plate 140 may be formed of a transparent plastic or glass material. The front plate 140 may include a plurality of sides, first to fourth sides 140a to 140d. The first and second sides 140a and 140b of the front plate 140 may have lengths shorter than the third and fourth sides 140c and 140d. According to an embodiment, the first side 140a may be positioned at the lower end of the front plate 140.

According to an embodiment of the disclosure, the front plate 140 may include an edge portion curved from the front surface of the housing 110 toward the rear surface. The front plate 140 may include an edge portion in at least one of the first to fourth sides 140a to 140d. For example, the first side 140a may include a first edge portion curved toward the rear surface when viewed in cross-section cut in a direction perpendicular to the first side 140a.

According to an embodiment of the disclosure, the display 13 may be at least partially exposed to the outside through the front plate 140. The display 13 may extend to the left and right sides of the electronic device 100. According to an embodiment, the display 13 may be a flexible display. The display 13 may be mounted in such a manner that the display 13 surrounds the housing 110 at the curvature of the left and right sides. For example, when viewed from one side of the front, rear, left, and right sides, the display 13 may surround at least 50 percent of the housing 110.

According to an embodiment of the disclosure, the back plate 150 may have a quadrangular shape, such as a rectangular shape when viewed from above the back plate 150. According to an embodiment, the back plate 150 may be formed of a transparent plastic or glass material. The back plate 150 may include four sides referred to as fifth to eighth sides 150a to 150d in the following description. The fifth and sixth sides 150a and 150b of the back plate 150 may have lengths shorter than the seventh and eighth sides 150c and 150d. According to an embodiment, the first side 140a may correspond to the fifth side 150a, the second side 140b may correspond to the sixth side 150b, the third side 140c may correspond to the seventh side 150c, and the fourth side 140d may correspond to the eighth side 150d.

According to an embodiment of the disclosure, the back plate 150 may include an edge portion curved from the back plate 150 of the housing 110 toward the front plate 140. The back plate 150 may include an edge portion in at least one of the fifth to eighth sides 150a to 150d. For example, the fifth side 150a may include a second edge portion curved toward the front plate 140 when viewed in cross-section cut in a direction perpendicular to the fifth side 150a.

According to an embodiment of the disclosure, the side member 120 may be arranged in the space between the front and back plates 140 and 150. For example, the side member 120 may surround the space between the front and back plates 140 and 150. The side member 120 may be arranged in such a manner that the side member 120 surrounds four sides of the housing (e.g., the housing 110 of FIG. 1). The side member 120 may be arranged adjacent to the first to fourth sides 140a to 140d of the front plate 140. Although the side member 120 arranged on the first to fourth sides 140a to 140d of the front plate 140 is illustrated in FIG. 2, the side member 120 may be variously modified. For example, the side member 120 may extend from the first side 140a to the third side 140c and/or the fourth side 140d.

According to an embodiment of the disclosure, the electronic device 100 may include a conductive portion on at least a portion of the side member 120. For example, the conductive portion may be a metal frame exposed to the outside of the housing 110. For example, the conductive portion may be arranged adjacent to the first side 140a of the front plate 140.

According to an embodiment of the disclosure, the side member 120 may include a segment 130. For example, the segment 130 may be filled with an insulating material. According to an embodiment, the insulating material forming the segment 130 may be connected to an insulating material between the conductive portion and the front plate 140 or between the conductive portion and the back plate 150. According to an embodiment, the side member 120 may be formed with a plurality of segments 130. For example, the segment 130 may include first and second segments 131 and 132.

According to an embodiment of the disclosure, the side member 120 may include a plurality of conductive portions segmented by the segment 130. The conductive portions may be physically spaced apart from each other by the segment 130. The side member 120 segmented by the segment 130 may include first to third conductive portions 121 to 123. Although the side member 120 including three conductive portions is illustrated in FIG. 2 for the purpose of convenient explanation, the number of conductive portions formed in the side member 120 may be variously changed. For example, the side member 120 may include one conductive portion.

Figure 3:
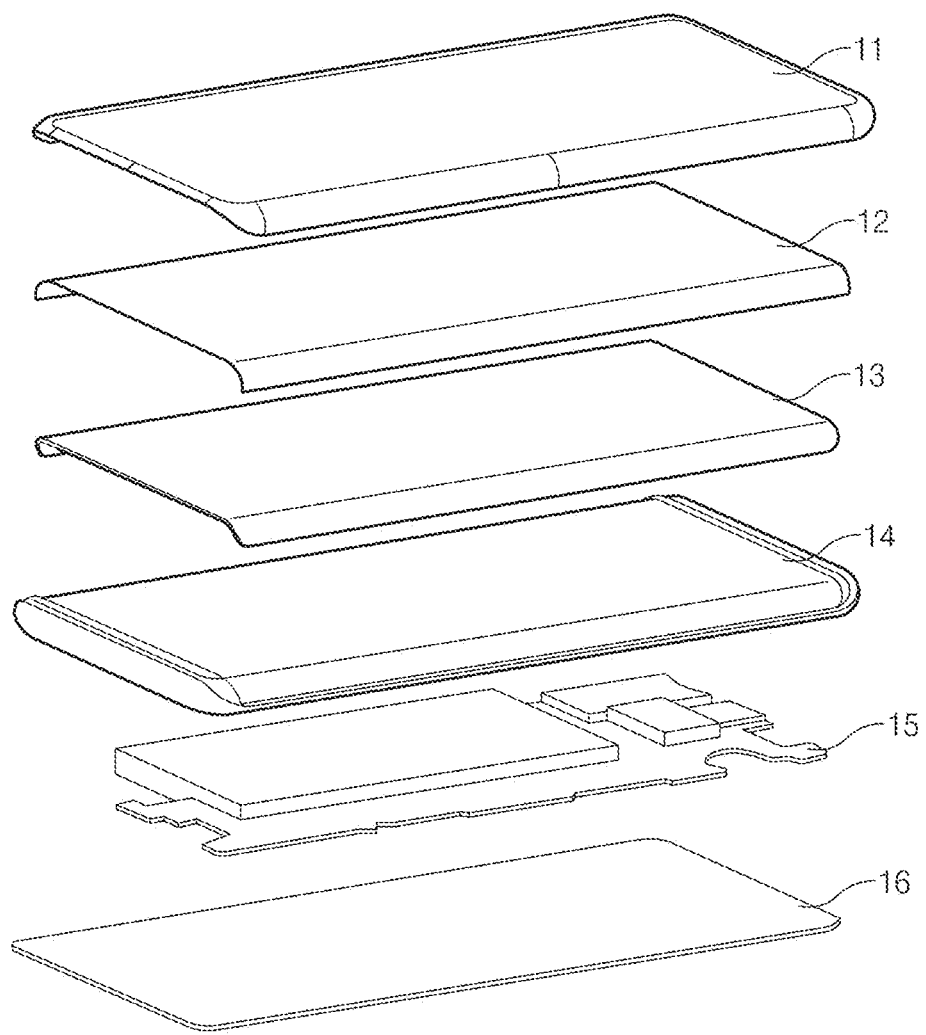
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 100 according to an embodiment may include a window 11, an adhesive layer 12, the display 13, a support member 14, a hardware component 15, or a rear housing 16.

According to an embodiment of the disclosure, the window 11 may be, for example, an outer protective layer configured to protect an outside of the display 13. The window 11 may be formed of a transparent material, such as a glass material, a polymer material, and the like. According to an embodiment, the window 11 may be a front plate (e.g., the front plate 140 of FIG. 2).

According to an embodiment of the disclosure, the adhesive layer 12 may allow the window 11 and the display 13 to adhere to each other. The adhesive layer 12 may be formed of an optical clear adhesive.

According to an embodiment of the disclosure, at least a portion of the display 13 may be transparent. The display 13 may be arranged to occupy at least a portion of a first surface (e.g., the first surface 111 of FIG. 1) of the electronic device 100. According to an embodiment, the display 13 may include at least one pixel.

According to an embodiment of the disclosure, the electronic device 100 may include a side member (e.g., the side member 120 of FIG. 2) that is provided to surround the side surface of the display 13. The support member 14 (e.g., a bracket) may be positioned between the display 13 and the rear housing 16 to fix the hardware component 15, such as a printed circuit board, a battery, and the like. The support member 14 may be formed of, for example, a metal material (e.g., magnesium) or a plastic material. The support member 14 may be a portion of the side member or integrated with the side member or may include the side member.

According to an embodiment of the disclosure, the housing may include a front housing and a rear housing 16. The rear housing 16 may be formed of a plastic injection material or a metal material. For a design effect, the electronic device 100 may further include a glass layer surrounding the rear housing 16. According to an embodiment, the side members may be integral with or separated from the support member 14. The side member is separated from the support member 14 but may be in a coupled state.

According to an embodiment of the disclosure, the hardware component 15 may be arranged between the rear housing 16 and the support member 14. According to an embodiment, a back plate (e.g., the back plate 150 of FIG. 2) may be the rear housing 16 or a glass layer surrounding the rear housing 16.

According to an embodiment of the disclosure, the hardware component 15 may include a printed circuit board, an application processor (AP), a communication processor (CP), a battery, a power management integrated circuit (PMIC), a speaker, a motor, a sensor, a connector, or the like.

Figure 4:
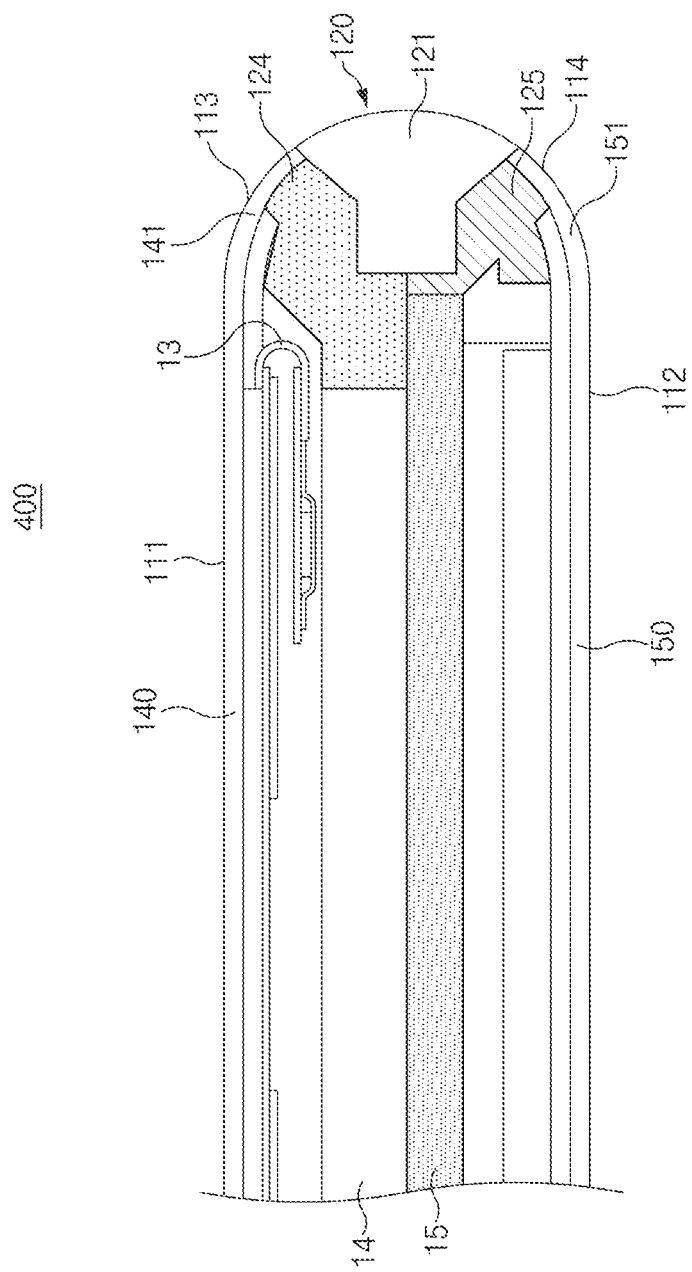
FIG. 4 is a sectional view of a portion of an electronic device according to an embodiment of the disclosure.

FIG. 4 is a sectional view illustrating a part of an electronic device according to an embodiment of the disclosure.

FIG. 4 illustrates a section in a direction perpendicular to the first side of the front plate 140. Referring to FIG. 4, an electronic device 400 (e.g., the electronic device 100 of FIG. 1) may include first and second surfaces 111 and 112 and a first curved portion 113 curved from the first surface 111 toward the second surface 112. The electronic device 400 may further include a second curved portion 114 curved from the second surface 112 toward the first surface 111. The first and second curved portions 113 and 114 may form one curved portion. According to an embodiment, the electronic device 400 may be the same as or similar to the electronic device 100 of FIG. 1 or FIG. 2.

Referring to FIG. 4, the front plate 140 and/or the back plate 150 may include a curved portion. According to an embodiment, the front plate 140 may be the same as or similar to the front plate 140 of FIG. 2 or the window 11 of FIG. 3. The back plate 150 may be the same as or similar to the back plate 140 of FIG. 2 or the rear housing 16 of FIG. 3.

According to an embodiment of the disclosure, the front plate 140 may include at least portions of the first surface 111 and the first curved portion 113. The at least a portion of the first curved portion 113 may be a first edge portion 141 or may include the first edge portion 141. According to an embodiment, the front plate 140 or the first edge portion 141 may be in contact with a conductive portion 121. For example, the front plate 140 may extend to the conductive portion 121. The display 13 may be arranged below the front plate 140.

According to an embodiment of the disclosure, the back plate 150 may include the second surface 112 and at least a portion of the second curved portion 114. The at least a portion of the second curved portion 114 included in the back plate 150 may be a second edge portion 151 or may include the second edge portion 151. According to an embodiment, the back plate 150 or the second edge portion 151 may be in contact with the conductive portion 121. Although the back plate 150 including the second edge portion 151 is illustrated in FIG. 4, according to various embodiments of the disclosure, the back plate 150 may be variously modified. For example, the back plate 150 may not include the second edge portion 151.

According to an embodiment of the disclosure, the support member 14 and the hardware component 15 may be arranged between the front and back plates 140 and 150. For example, the hardware component 15 may include a printed circuit board, a processor, a communication circuit, or the like. According to an embodiment, the support member 14 and the hardware component 15 of FIG. 4 may be the same as or similar to the support member 14 and the hardware component 15 of FIG. 3.

According to an embodiment of the disclosure, the side member 120 may include a curved portion on at least a portion thereof. For example, the side member 120 may include a portion of the first curved portion 113 or a portion of the second curved portion 114. According to another embodiment, the side member 120 may not include the curved portion. The side member 120 may include the conductive portion 121 on a portion thereof. The conductive portion 121 may be the same as or similar to the first conductive portion 121 of FIG. 2.

According to an embodiment of the disclosure, the electronic device 400 may include a first non-conductive portion 124 of which at least a portion is adjacent to or makes contact with the front plate 140 and/or the conductive portion 121. According to an embodiment, the non-conductive portion 124 may be formed inside the housing such that the non-conductive portion 124 is not seen when viewed from an outside of the housing (e.g., the housing 110 of FIG. 1).

According to an embodiment of the disclosure, the electronic device 400 may include a second non-conductive portion 125 of which a portion is adjacent to or in contact with the back plate 150 and/or the conductive portion 121. The second non-conductive portion 125 may be formed inside the housing such that the second non-conductive portion 125 is not exposed when viewed from an outside of the housing. The second non-conductive portion 125 may make contact at least with the second edge portion 151 of the back plate 150.

According to an embodiment of the disclosure, the first non-conductive portion 124 and/or the second non-conductive portion 125 may be an injection portion of the support member 14 or include an injection portion. According to an embodiment, the first non-conductive portion 124 and/or the second non-conductive portion 125 may be formed of a plastic material.

Figure 5:
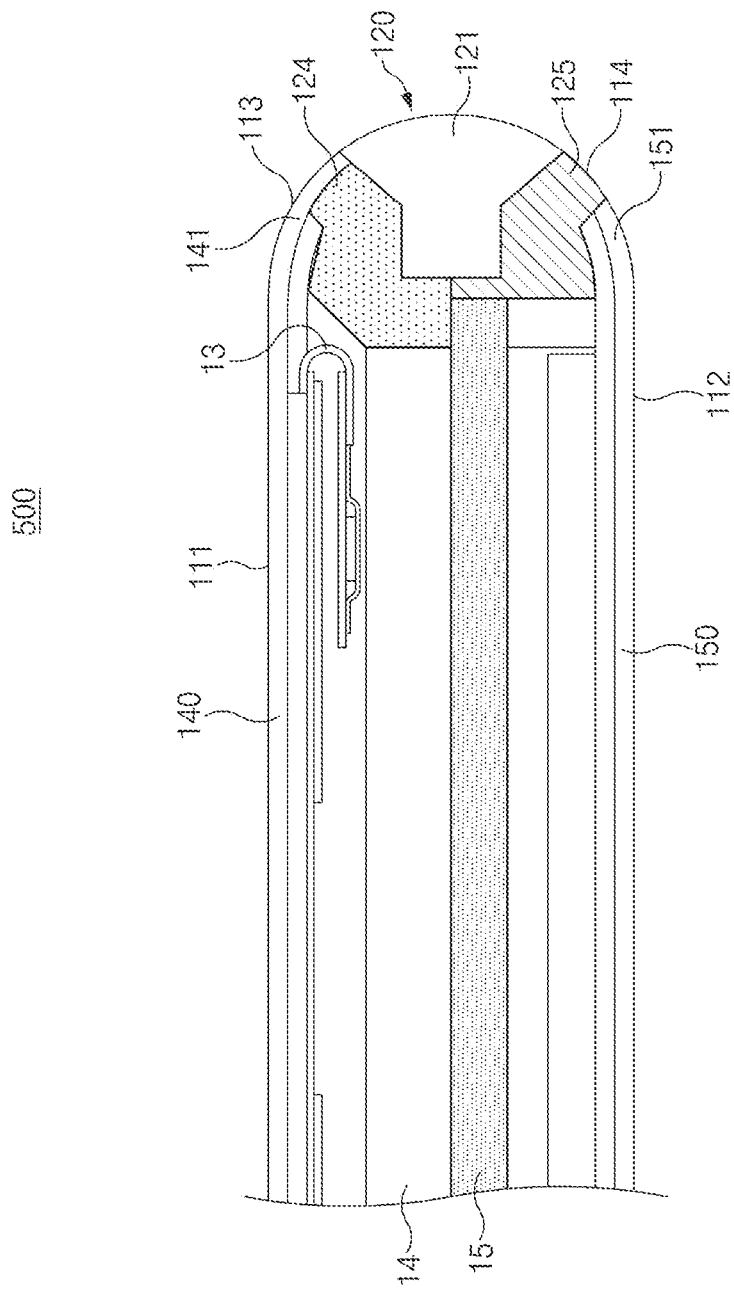
FIG. 5 is a sectional view of a portion of an electronic device according to an embodiment of the disclosure.

FIG. 5 is a sectional view of a portion of an electronic device according to an embodiment of the disclosure.

FIG. 5 illustrates a section in a direction perpendicular to the first side of the front plate 140 of the electronic device (e.g., electronic device 400 of FIG. 4) 500.

Referring to FIG. 5, an electronic device 500 may include first and second surfaces 111 and 112 and the first curved portion 113 curved from the first surface 111 toward the second surface 112. The electronic device 500 may further include the second curved portion 114 curved from the second surface 112 toward the first surface 111. The electronic device 500 may include the display 13, the support member 14, or the hardware component 15. According to an embodiment, the first and second surfaces 111 and 112, the first and second curved portions 113 and 114, the display 13, the support member 14, and a hardware component 15 may be the same as or similar to those of FIG. 4, and thus the details will be omitted below.

Referring to FIG. 5, the front plate 140 and the back plate 150 may include the first and second edge portions 141 and 151 including at least a portion of the curved portion. For example, the first edge portion 141 of the front plate 140 may include at least a portion of the first curved portion 113. For example, the second edge portion 151 of the back plate 150 may include at least a portion of the second curved portion 114.

According to an embodiment of the disclosure, the first non-conductive portion 124 may be arranged between the front plate 140 and the conductive portion 121. The first non-conductive portion 124 may be arranged between the front plate 140 and the conductive portion 121 when viewed from a side surface corresponding to the first side (e.g., the first side 111a of FIG. 1). The front plate 140 and the conductive portion 121 may be spaced at least partially and physically apart from each other by the first non-conductive portion 124. According to an embodiment, the first edge portion 141 of the front plate 140 may make contact with the first non-conductive portion 124. The first non-conductive portion 124 may form a portion of the housing (e.g., the housing 110 of FIG. 1).

According to an embodiment of the disclosure, the second non-conductive portion 125 may be arranged between the back plate 150 and the conductive portion 121. The second non-conductive portion 125 may be arranged between the back plate 150 and the conductive portion 121 when viewed from the first side (e.g., the first side 111a of FIG. 1). The back plate 150 and the conductive portion 121 may be spaced at least partially and physically apart from each other by the second non-conductive portion 125. According to an embodiment, the second edge portion 151 of the back plate 150 may make contact with the second non-conductive portion 125.

According to an embodiment of the disclosure, the side member 120 may be arranged between the front and back plates 140 and 150. The side member 120 of FIG. 5 is the same as or similar to the side member 120 of FIG. 4 and thus the details will be omitted below.

According to an embodiment of the disclosure, the first non-conductive portion 124 and/or the second non-conductive portion 125 may be an injection portion of the support member 14. For example, the first non-conductive portion 124 may be a plastic injection portion.

Although the side member 120 and the non-conductive portions 124 and 125 separated from each other have been described in FIG. 5, according to various embodiments of the disclosure, the side member 120 may include the non-conductive portions 124 and 125.

Figure 6:
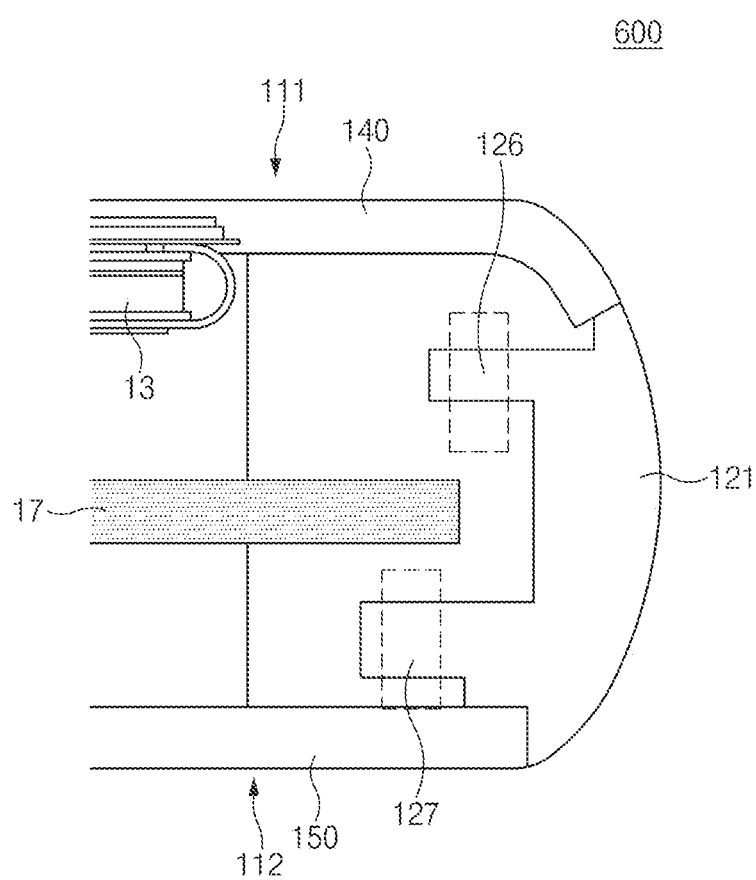
FIG. 6 is a sectional view of a portion of an electronic device according to an embodiment of the disclosure.

FIG. 6 illustrates an internal configuration of an electronic device according to an embodiment of the disclosure.

Referring to FIG. 6, according to an embodiment of the disclosure, the conductive portion 121 of an electronic device 600 may be electrically connected to a point of a printed circuit board 17. The electronic device 600 may be the same as or similar to the electronic device 400 of FIG. 4 or the electronic device 500 of FIG. 5.

According to an embodiment of the disclosure, the front plate 140 is the same as or similar to the front plate 140 of FIG. 4 or 5 and the conductive portion 121 may be the same as or similar to the conductive portion 121 of FIG. 4 or 5. Although the back plate 150 which includes the second surface 112 and does not include the edge portion or the curved portion is illustrated in FIG. 6, the back plate 150 may include the edge portion or the curved portion as shown in FIG. 4 or 5.

According to an embodiment of the disclosure, the printed circuit board 17 may be at least a portion of the hardware component 15 of FIG. 3. The conductive portion 121 may be connected to the printed circuit board 17 through a connecting member (e.g., a C-clip) or a portion protruding from a portion of the conductive portion 121 may be connected to the printed circuit board 17.

According to an embodiment of the disclosure, a communication circuit (e.g., the communication module 1990 of FIG. 19) for supplying an electrical signal or a power feeding portion may be arranged on the printed circuit board 17. According to an embodiment, a ground portion is arranged on the printed circuit board 17 and a ground layer for providing grounding may be formed on the printed circuit board 17.

According to an embodiment of the disclosure, the conductive portion 121 may include flanges 126 and 127 which protrude from portions of the conductive portion 121 to connect with the power feeding portion and/or the ground portion. For example, the conductive portion 121 may include the first flange 126 adjacent to the first surface 111 and the second flange 127 adjacent to the second surface 112. The first surface 111 may be a surface adjacent to the display 13.

According to an embodiment of the disclosure, the first and second flanges 126 and 127 may have mutually different lengths such that the first and second flanges 126 and 127 are sufficiently electrically spaced apart from each other. For example, since the first flange 126 is adjacent to the display 13 than the second flange 127 the first flange 126 may have a relatively short length. By reducing the length of the first flange 126, the deterioration of the radiation performance due to interference of the display 13 may be mitigated.

Figure 7:
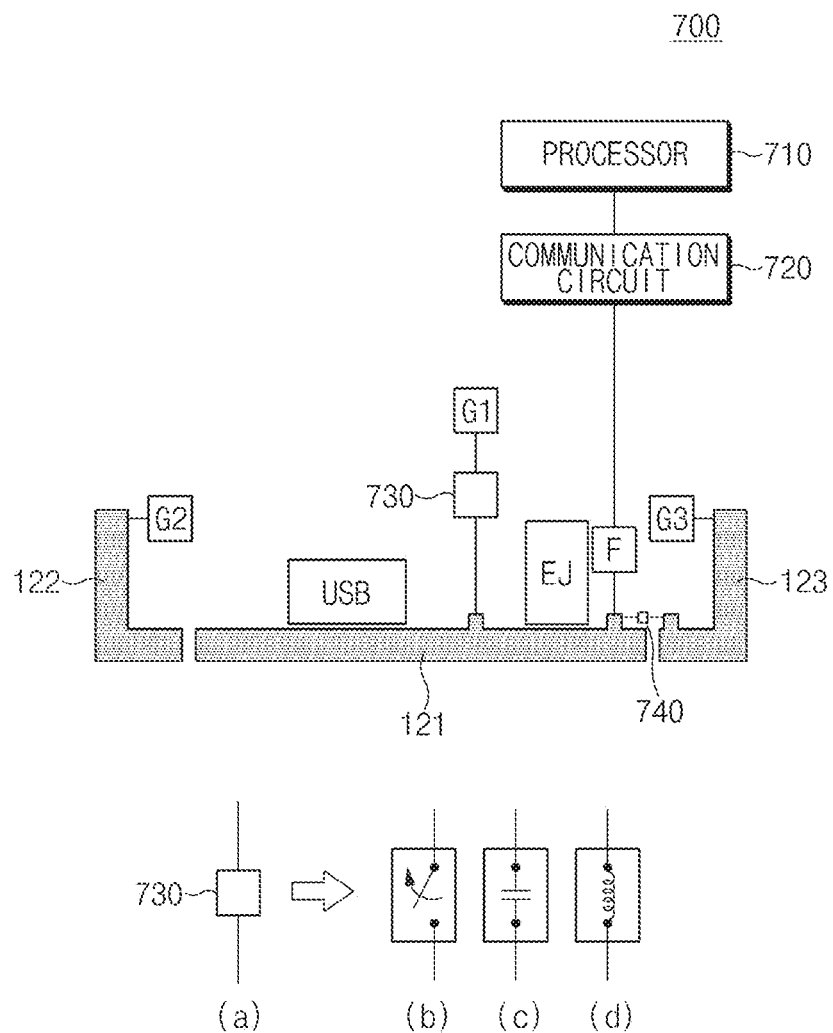
FIG. 7 is a view illustrating an antenna structure according to an embodiment of the disclosure.

FIG. 7 illustrates an antenna structure according to an embodiment of the disclosure.

Referring to FIG. 7, an antenna structure of an electronic device 700 including the first conductive portion 121, the second conductive portion 122 or the third conductive portion 123 according to an embodiment is illustrated in FIG. 7. According to an embodiment, the electronic device 700 may be the electronic device 100 of FIGS. 1 to 3, the electronic device 400 of FIG. 4, the electronic device 500 of FIG. 5, or the electronic device 600 of FIG. 6.

According to an embodiment of the disclosure, the first conductive portion 121 may be operated as an antenna when an electrical signal is supplied to the first conductive portion 121. The first conductive portion 121 may be connected to a power feeding portion F. According to an embodiment, the power feeding portion may be arranged on a printed circuit board (e.g., the printed circuit board 17 of FIG. 6). The power feeding portion may transmit a signal, which is transmitted from a communication circuit 720, to the first conductive portion 121. The power feeding portion may be arranged between the communication circuit 720 and the first conductive portion 121 and may include a matching circuit.

The first conductive portion 121 may be electrically connected to a first ground portion G1. The first ground portion G1 may be arranged on the printed circuit board and may be connected to an antenna ground for providing a ground to the antenna through a ground connection circuit 730.

According to an embodiment of the disclosure, the ground portion, for example, the first ground portion G1 and/or a second ground portion G2 may be electrically connected to the antenna ground and the radiator. The antenna ground may include a ground layer (e.g., a PCB ground) formed on the printed circuit board, a metal member of a support member (e.g., the support member 14 of FIG. 3) electrically connected to the ground layer, and/or a ground portion of a display (e.g., the display 13 of FIG. 3).

According to an embodiment of the disclosure, the ground portion may be electrically connected to the ground layer. The ground layer may be electrically connected to the metal member and/or the ground portion. For example, the printed circuit board may include a conductive layer and the ground layer may be formed on the conductive layer.

According to an embodiment of the disclosure, the electronic device 700 may further include a ground connection circuit 730 configured to connect the first conductive portion 121 and the first ground portion G1. The ground connection circuit 730 may control the opening and closing of the electric path and/or control the resonant frequency of the first conductive portion 121.

According to an embodiment of the disclosure, the ground connection circuit 730 may include at least one of a switch b for controlling the opening and closing of the electric path and a matching device for controlling a frequency, such as a capacitor c or an inductor d. According to an embodiment, the ground connection circuit 730 may be implemented with various combinations of the switch b and the matching devices c and d. The switch b and/or the matching devices c and d may be connected in a series structure, a parallel structure, or a series-parallel structure.

According to an embodiment of the disclosure, the first conductive portion 121 may be electrically connected to the third conductive portion 123 to secure an electrical length. For example, the electronic device 700 may further include a radiator connection circuit 740 for connecting the first and third conductive portions 121 and 123. For example, the radiator connection circuit 740 may include a switch for controlling the opening and closing of the electrical path between the first and third conductive portions 121 and 123. A processor 710 may control the switching operation of the switch to adjust the electrical length of the antenna.

According to an embodiment of the disclosure, the second conductive portion 122 may be electrically connected to the second ground portion G2. The third conductive portion 123 may be electrically connected to a third ground portion G3.

Figure 19:
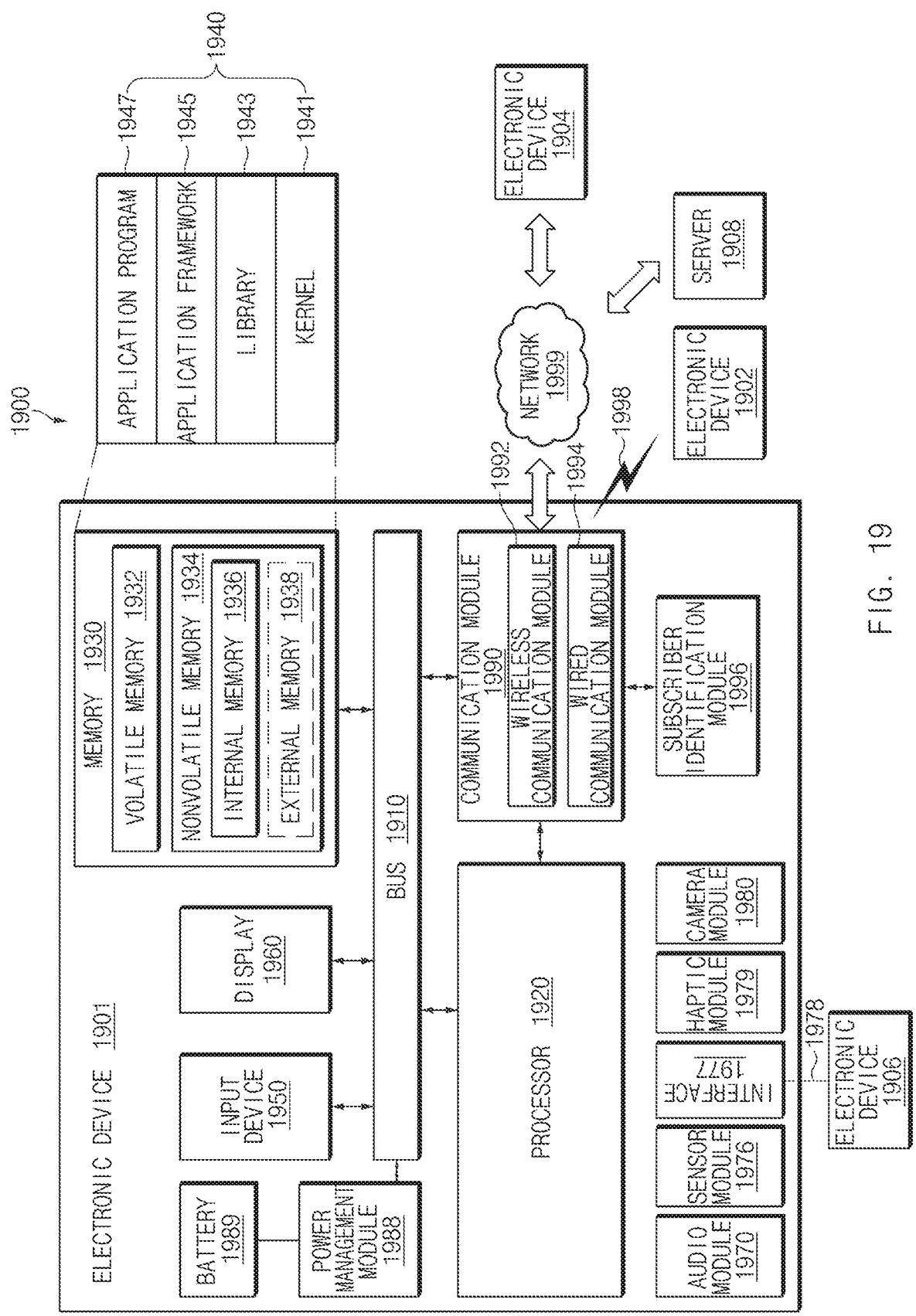
FIG. 19 is a block diagram illustrating an electronic device in a network environment according to an embodiment of the disclosure.

According to an embodiment, the electronic device 700 may include the processor 710 (e.g., AP or CP) and the communication circuit 720 (e.g., a radio frequency integrated circuit (RFIC) or the communication module 1990 of FIG. 19) to transmit/receive a signal.

According to an embodiment of the disclosure, the processor 710 may be connected to the communication circuit 720 and may control the communication circuit 720 to transmit/receive a signal of a target frequency. For example, the processor 710 may allow the communication circuit 720 to transmit/receive a signal in a middle band (e.g., about 1700 MHz to 2200 MHz).

According to an embodiment of the disclosure, the processor 710 and the communication circuit 720 may, for example, be arranged on the printed circuit board.

Figure 8:
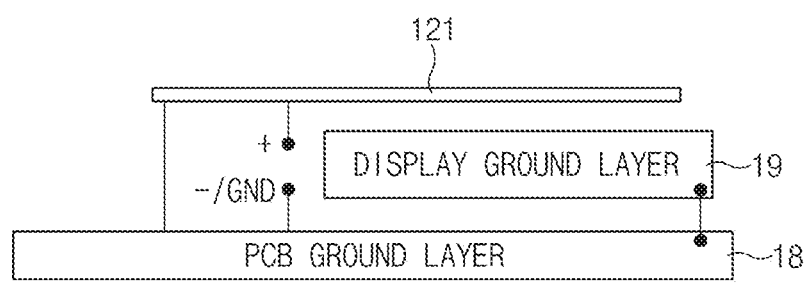
FIG. 8 schematically illustrates an antenna structure according to an embodiment of the disclosure.

FIG. 8 schematically illustrates an antenna structure according to an embodiment of the disclosure.

Referring to FIG. 8, according to an embodiment of the disclosure, the antenna of an electronic device 800 may be operated as an inverted-F antenna. The electronic device 800 may be the same as or similar to the electronic device 100 of FIGS. 1 to 3, the electronic device 400 of FIG. 4, the electronic device 500 of FIG. 5, the electronic device 600 of FIG. 6, or the electronic device 700 of FIG. 7. In the following description, the conductive portion 121 may be the same as or similar to the first conductive portion 121 of FIG. 2.

According to an embodiment of the disclosure, the conductive portion 121 may be electrically connected to the power feeding portion and the ground portion. According to an embodiment, the power feeding portion and the ground portion may be arranged on a printed circuit board (e.g., the printed circuit board 17 of FIG. 6).

According to an embodiment of the disclosure, the power feeding portion may transmit an electrical signal to the conductive portion 121. The power feeding portion may be connected to a communication circuit (e.g., the communication circuit 720 of FIG. 7) through a matching circuit arranged on the printed circuit board.

According to an embodiment of the disclosure, the ground portion may be arranged on the printed circuit board and electrically connected to a ground layer 18. The ground layer 18 may ground the conductive portion 121. The ground layer 18 may be formed on a conductive layer of the printed circuit board.

According to an embodiment of the disclosure, a display (e.g., the display 13 of FIG. 4) of the electronic device 700 may be adjacent to the conductive portion 121. As the display expands, the power feeding portion and the conductive portion 121 are close to the conductive layer of the display, so that the bandwidth and performance of the antenna may deteriorate.

According to an embodiment of the disclosure, the ground layer 18 of the printed circuit board may be electrically connected to a ground layer 19 formed by the display. For example, the ground layer 18 of the printed circuit board may be connected to the ground layer 19 of the display by using a flexible printed circuit board (FPCB) connector. According to an embodiment, the ground layer 19 of the display may be formed on the conductive layer of the display. When connecting the ground layer 18 of the printed circuit board and the ground layer 19 of the display, in the antenna, the conductive layer of the display may operate similarly to the ground layer of the printed circuit board.

Figure 9:
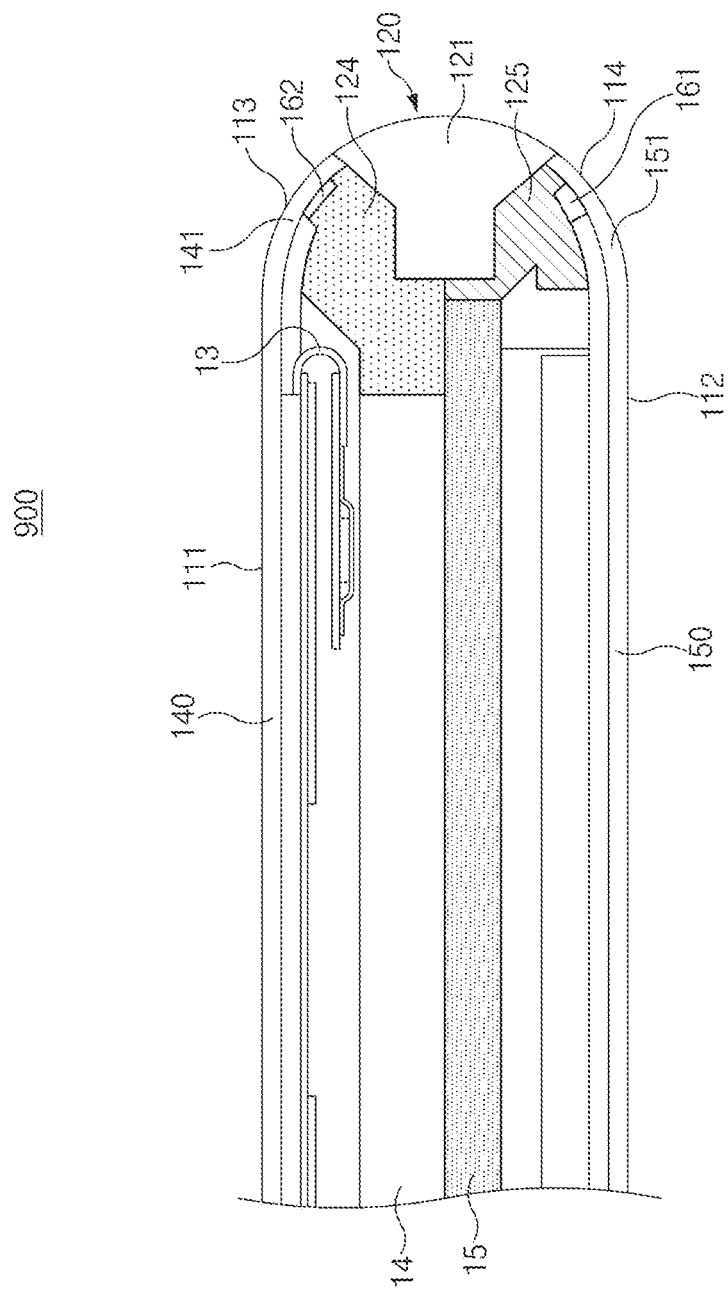
FIG. 9 is a sectional view of a portion of an electronic device according to an embodiment of the disclosure.

FIG. 9 is a sectional view of a portion of an electronic device according to an embodiment of the disclosure.

Referring to FIG. 9, an internal configuration of an electronic device is illustrated when viewed in cross-section cut in a direction perpendicular to a first side (e.g., the first side 140a of FIG. 2) according to an embodiment. An electronic device 900 of FIG. 9 is the same as or similar to the electronic device 400 of FIG. 4, and thus the details will be will be omitted in the following description.

Referring to FIG. 9, the electronic device 900 may include a conductive pattern that operates as an independent antenna or that operates with the conductive portion 121 as one antenna. According to an embodiment, the conductive pattern may be arranged to minimize interference with the display 13. According to an embodiment, a first conductive pattern 161 may be arranged to reduce interference with the display 13 and be physically spaced apart from the first conductive portion 121. The first conductive pattern 161 may be provided on the second curved portion 114 or on the second surface 112 adjacent to the second curved portion 114. For example, the first conductive pattern 161 may be arranged between the second edge portion 151 of the back plate 150 and the second non-conductive portion 125 or may be mounted on the second non-conductive portion 125. The first conductive pattern 161 may extend along the inner surface of the second edge portion 151 of the back plate 150.

According to an embodiment of the disclosure, the electronic device 900 may further include a second conductive pattern 162. The second conductive pattern 162 may be provided on the first curved portion 113 or arranged to reduce interference with the display 13 while being adjacent to the first curved portion 113. The second conductive pattern 162 may be physically spaced apart from the conductive portion 121 by the first non-conductive portion 124. For example, the second conductive pattern 162 may be arranged between the first edge portion 141 and the first non-conductive portion 124 or may be mounted on the first non-conductive portion 124. The second conductive pattern 162 may extend along the inner surface of the first edge portion 141.

The electronic device 900 of FIG. 9 may be variously modified according to various embodiments. For example, the second conductive pattern 162 may be arranged on the first curved portion 113, but a ground portion may be arranged on the first curved portion 113 to reduce interference with the display 13.

Figure 10:
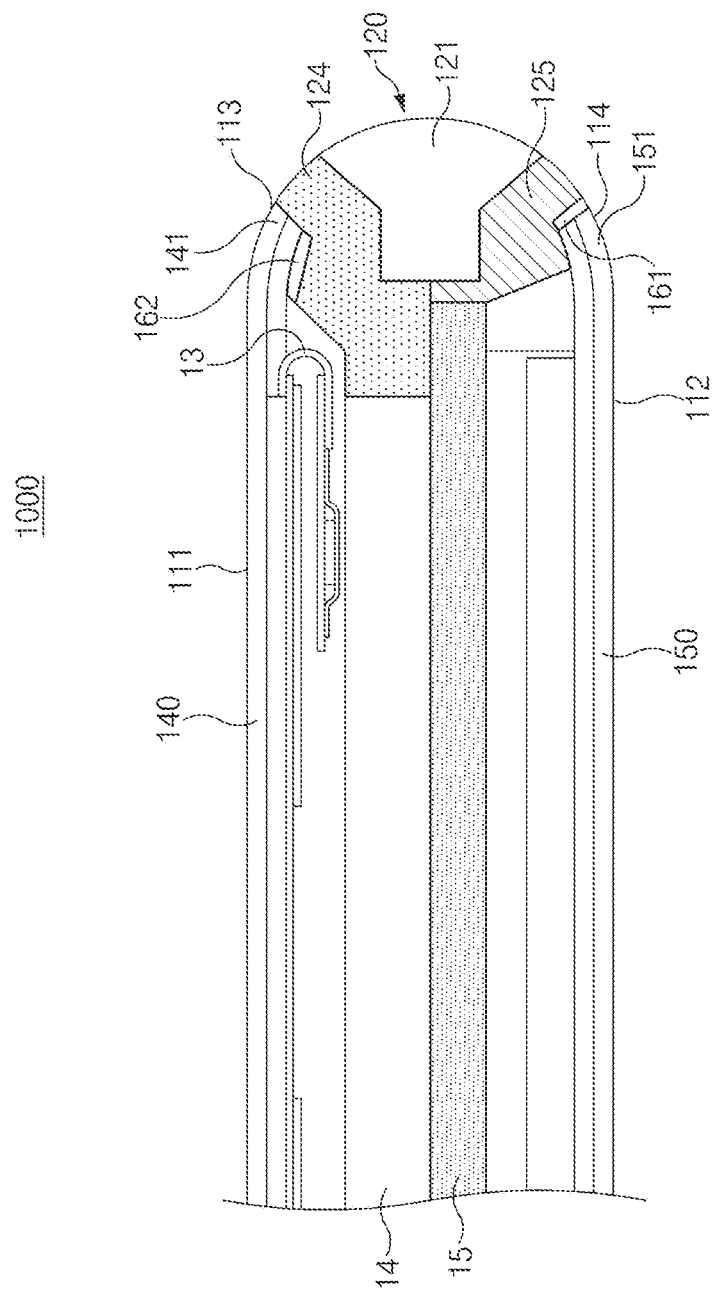
FIG. 10 is a sectional view of a portion of an electronic device according to an embodiment of the disclosure.

FIG. 10 is a sectional view of a portion of an electronic device according to an embodiment of the disclosure.

Referring to FIG. 10, an internal configuration of an electronic device is illustrated when viewed in cross-section cut in a direction perpendicular to a first side (e.g., the first side 140a of FIG. 2) according to an embodiment. An electronic device 1000 of FIG. 10 is the same as or similar to the electronic device 500 of FIG. 5, and thus the details will be will be omitted in the following description.

According to an embodiment of the disclosure, the electronic device 1000 may further include a conductive pattern that operates independently of the conductive portion 121 or that operates with the conductive portion 121 as one antenna. The conductive pattern may be arranged to reduce interference with the display 13 and to be physically spaced apart from the conductive portion 121.

According to an embodiment of the disclosure, the first conductive pattern 161 may be arranged to be adjacent to the back plate 150 and physically spaced from the conductive portion 121 such that interference with the display 13 is reduced. For example, the first conductive pattern 161 may be arranged between the back plate 150 and the second non-conductive portion 125 or may be mounted on the second non-conductive portion 125. The first conductive pattern 161 may be arranged inside the second edge portion 151 of the back plate 150. The first conductive pattern 161 may be arranged inside the second surface 112.

According to an embodiment of the disclosure, the electronic device 1000 may include the second conductive pattern 162 at a position where the second conductive pattern 162 is adjacent to the front plate 140 and physically spaced apart from the conductive portion 121. The second conductive pattern 162 may be disposed at a position where interference with the display 13 is reduced. The second conductive pattern 162 may be arranged between the front plate 140 and the first non-conductive portion 124 or may be mounted on the first non-conductive portion 124.

The electronic device 1000 of FIG. 10 may be variously modified according to various embodiments. For example, the second conductive pattern 162 may be arranged on the first curved portion 113, but a ground portion may be arranged on the first curved portion 113 to reduce interference with the display 13.

Figures 11A, 11B:
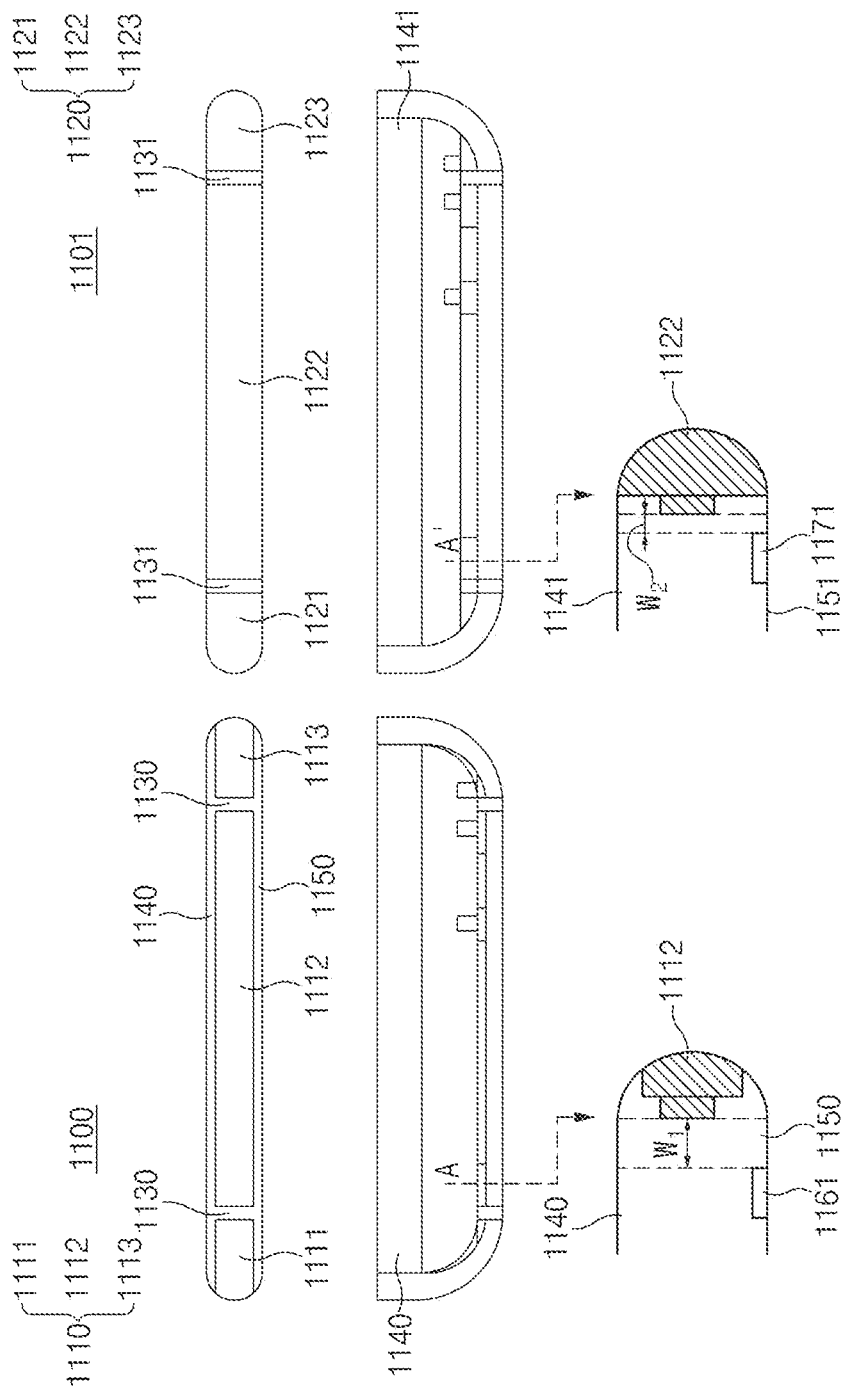
FIGS. 11A and 11B illustrate a lower end of an electronic device according to various embodiments of the disclosure.

FIGS. 11A and 11B illustrate a lower end of an electronic device according to various embodiments of the disclosure.

FIG. 11A illustrates the lower end of an electronic device according to an embodiment and FIG. 11B illustrates the lower end of an electronic device according to a comparative example.

Referring to FIG. 11A, an electronic device 1100 (e.g., the electronic device 100 of FIG. 1) according to an embodiment may include a front plate 1140, a back plate 1150, and a side member 1110. The electronic device 1100 may include the front plate 1140, the back plate 1150, and the side member 1110 on at least one side when viewing the side of the electronic device 1100. For example, when viewed from a lower end side surface of the electronic device 1100, the front plate 1140, the back plate 1150, and the side member 1110 may be provided on the lower end side surface.

According to an embodiment of the disclosure, the side member 1110 may include a plurality of conductive portions physically spaced apart from each other by a segment 1130. The conductive portions may include first to third conductive portions 1111 to 1113.

According to an embodiment of the disclosure, when the front and back plates 1140 and 1150 are extended to include an edge portion (e.g., the first and second edge portions 141 and 151 of FIG. 4), the width of the side member 1110 in a first direction (e.g., +x or −x) may be narrower than that of the comparative example of FIG. 11B.

FIG. 11A illustrates a cross-section taken by cutting a portion A of the electronic device 1100. Referring to FIG. 11A, by extending the display (e.g., the display 13 of FIG. 3), the front plate 1140 and/or the back plate 1150 may be expanded to include an edge portion.

According to an embodiment of the disclosure, when the front plate 1140 and/or the back plate 1150 are extended, the first direction width of the side member 1110 may be reduced as compared with the comparative example. For example, the first direction width w1 of the second conductive portion 1112 may be wider than a first direction width w2 of a second conductive portion 1122 according to the comparative example.

According to an embodiment of the disclosure, the electronic device 1100 may further include a conductive pattern 1161 that operates as an antenna separated from the second conductive portion 1112 or one antenna. The conductive pattern 1161 may be arranged to be adjacent to the back plate 1150 and physically spaced apart from the second conductive portion 1112.

Referring to FIG. 11B, an electronic device 1101 according to the comparative example includes a front plate 1141, a back plate 1151, and a side member 1120. When the display of the electronic device 1101 is not extended, the front and back plates 1141 and 1151 of the electronic device 1101 may not include an edge portion (e.g., the first or second edge portion 141 or 151 of FIG. 4) of the electronic device 1101. In this case, when viewed from the side, the electronic device 1101 may include only the side member 1120.

According to the comparative example, the side member 1120 may include first to third conductive portions 1121 to 1123 separated from each other by a segment 1131.

FIG. 11B illustrates a cross-section taken by cutting a portion A of the electronic device 1101. Referring to FIG. 11B, when the display is not extended, the front side member 1120 may occupy more area of the electronic device 1101 as compared with that of FIG. 11A. In this case, the first direction width of the side member 1120 may be wider than that of the side member 1110 in the first direction according to an embodiment. For example, the first direction width w2 of the second conductive portion 1122 of the electronic device 1101 may be narrower than a first direction width w1 of the second conductive portion 1112 of the electronic device 1100 according to an embodiment.

According to an embodiment of the disclosure, the electronic device 1101 may further include a conductive pattern 1171 that operates as an antenna separated from the second conductive portion 1122 or one antenna. The conductive pattern 1171 may be arranged to be adjacent to the back plate 1151 and physically spaced apart from the second conductive portion 1122.

According to an embodiment of the disclosure, when the first direction width of the side member 1110 is reduced, coupling between the conductive portions 1111 to 1113 caused by the segment 1130 may be reduced. Due to the reduction of coupling, the resonant frequency of the antenna using at least one of the conductive portions may be shifted up. For example, when the segment 1130 according to an embodiment and the segment 1131 according to the comparative example have the same segment gap, the antenna including the second conductive portion 1112 may transmit/receive a signal of a higher frequency than an antenna including the second conductive region 1122.

According to an embodiment of the disclosure, when the first direction width of the side member 1120 is reduced, a narrower segment gap may be realized under the same coupling coefficient condition. For example, when the segment 1130 according to an embodiment and the segment 1131 according to the comparative example have the same coupling coefficient, the segment 1130 may be implemented to have a narrower segment gap by the segment 1131.

Figure 12:
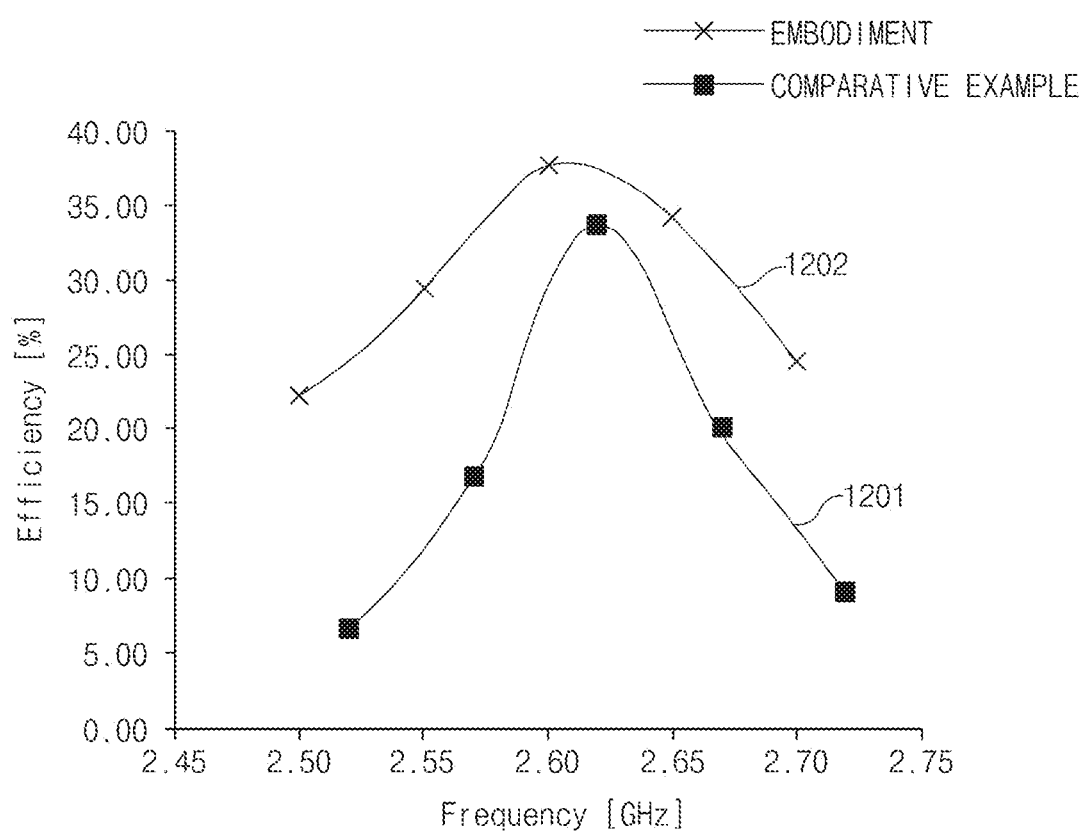
FIG. 12 is a graph illustrating antenna efficiency of a first antenna according to an embodiment of the disclosure.

FIG. 12 is a graph illustrating antenna efficiency according to an embodiment of the disclosure.

Referring to FIG. 12, graph 1 1201 of FIG. 12 illustrates the antenna efficiency (%) of the conductive pattern (e.g., the second conductive pattern 1171 of FIG. 11B) according to the comparative example, and graph 2 1202 illustrates the antenna efficiency (%) of the conductive pattern (e.g., the second conductive pattern 1161 in FIG. 11A) according to an embodiment. The conductive pattern may operate as an antenna separated from the side members (e.g., the side members 1110 of FIG. 11A and the side members 1120 of FIG. 11B).

Referring to graph 1 1201, the conductive pattern according to the comparative example resonates at about 2.60 GHz to about 2.65 GHz, and the antenna efficiency is about 34% at the maximum.

Referring to graph 2 1202, the conductive pattern according to an embodiment resonates at about 2.55 GHz to about 2.65 GHz, and the antenna efficiency is about 37.5% at the maximum.

According to an embodiment of the disclosure, when the first direction width of the conductive portion is reduced, the efficiency of the antenna including the conductive pattern and the bandwidth of the antenna may be increased. When the display is expanded to the front according to an embodiment, the width of the side member (e.g., the side member 1120 of FIG. 11) may be narrowed and interference with the side member may be reduced, thereby improving the efficiency of the antenna including a conductive pattern.

Figure 13:
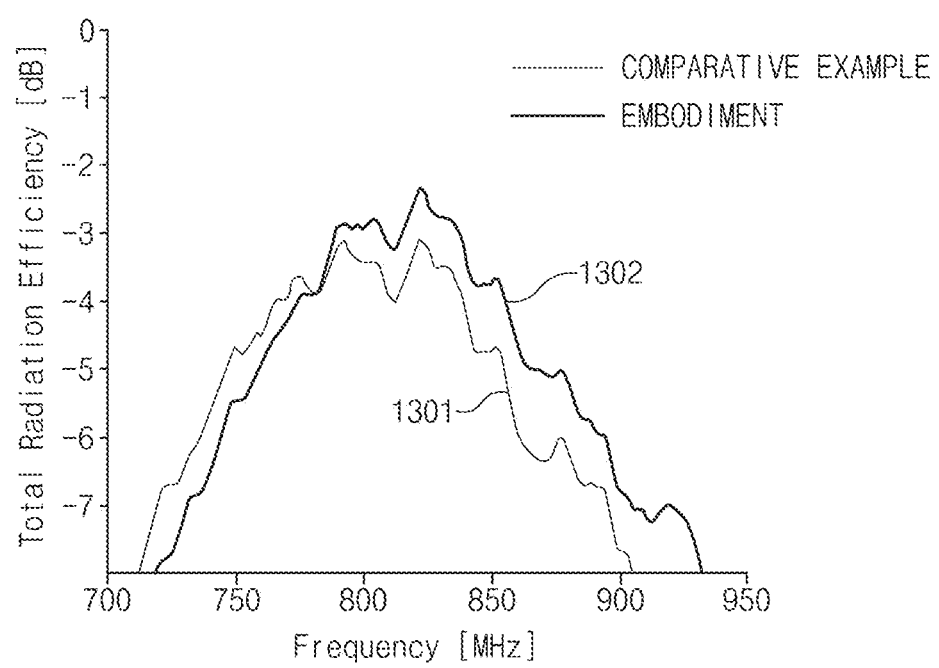
FIG. 13 is a graph illustrating radiation efficiency of a second antenna according to an embodiment of the disclosure.

FIG. 13 is a graph illustrating a total radiation efficiency of antennas according to an embodiment of the disclosure.

Referring to FIG. 13, graph 1 1301 of FIG. 13 illustrates the radiation efficiency (dB) of the conductive portion (e.g., the second conductive portion 1122 of FIG. 11B) according to the comparative example, and graph 2 1302 illustrates the radiation efficiency (dB) of the conductive portion (e.g., the second conductive portion 1112 of FIG. 11A) according to an embodiment.

The graph of FIG. 13 illustrates the radiation efficiency of the conductive portion in an environment where the conductive pattern (e.g., the second conductive portion 1112 of FIG. 11A and the second conductive portion 1122 of FIG. 11B) is used as an antenna independent of the conductive pattern (e.g., the conductive pattern 1161 of FIG. 11A and the conductive pattern 1171 of FIG. 11B).

Referring to FIG. 13, the antenna including the conductive portion according to the comparative example resonates at about 775 MHz to about 830 MHz, and the radiation efficiency is about −3.3 dB at the maximum.

The antenna including the conductive portion according to an embodiment resonates at about 775 MHz to about 850 MHz, and the radiation efficiency is about −2.5 dB at the maximum.

For example, according to an embodiment of the disclosure, when the display is expanded to the front of an electronic device and the conductive portion is used as an antenna radiator separate from the conductive pattern, the radiation efficiency of the antenna including the conductive portion may be high as compared with that of the comparative example.

Figure 14:
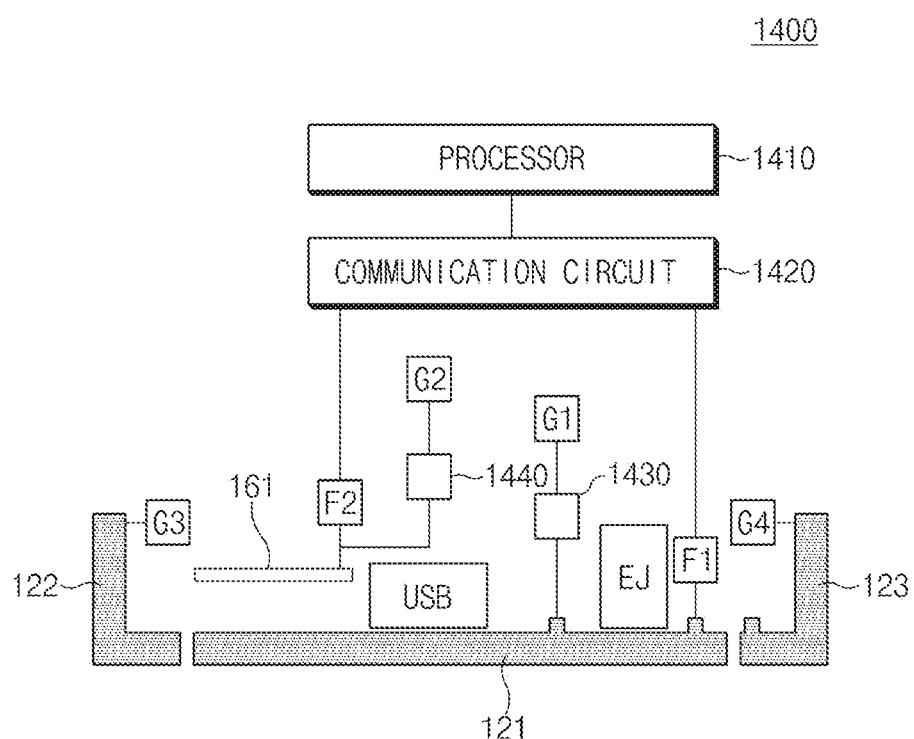
FIG. 14 is a view illustrating an antenna structure according to an embodiment of the disclosure.

FIG. 14 illustrates an antenna structure according to an embodiment of the disclosure.

Referring to FIG. 14, an electronic device 1400 according to an embodiment may include the first conductive portion 121 (e.g., the first conductive portion 121 of FIG. 1), the second conductive portion 122 (e.g., the second conductive portion 122 of FIG. 1) or the third conductive portion 123 (e.g., the third conductive portion 123 of FIG. 1), or the conductive pattern 161 (e.g., the first conductive pattern 161 of FIG. 9). The electronic device 1400 may be the same as or similar to the electronic device 900 of FIG. 9 or the electronic device 1000 of FIG. 10. The conductive pattern 161 may be the first conductive pattern 161 of FIG. 9 or 10.

According to an embodiment of the disclosure, the conductive pattern 161 may be variously modified. For example, the conductive pattern 161 may be a conductive pattern arranged on the first conductive pattern 161 of FIG. 9 or a printed circuit board (e.g., the printed circuit board 17 of FIG. 6).

Referring to FIG. 14, the electronic device 1400 may include a first antenna including the first conductive portion 121, and a second antenna including the conductive pattern 161 and operating as an antenna independent of the first antenna. A communication circuit 1420 may transmit/receive signals of the same frequency band or mutually different frequency bands by using the first and second antennas.

According to an embodiment of the disclosure, when an electrical signal is provided to the first conductive portion 121, the first conductive portion 121 may operate as the first antenna. The first conductive portion 121 may be connected to a first power feeding portion F1 and the communication circuit 1420 may transmit an electrical signal to the first conductive portion 121 through the first power feeding portion F1.

According to an embodiment of the disclosure, the first conductive portion 121 may be connected to a first ground portion G1. For example, the first conductive portion 121 may be connected to the first ground portion G1 through a first ground connection circuit 1430. According to an embodiment, the first ground connection circuit 1430 may include a switch of controlling the connection between the first conductive portion 121 and the ground portion, a tunable device, and/or a matching device (e.g., an inductor, a capacitor, or the like) of adjusting a resonance frequency.

According to an embodiment of the disclosure, when an electrical signal is provided to the conductive pattern 161, the conductive pattern 161 may operate as the second antenna. The conductive pattern 161 may be connected to a second power feeding portion F2. The communication circuit 1420 may transmit an electrical signal to the conductive pattern 161 through the second power feeding portion F2.

According to an embodiment of the disclosure, the conductive pattern 161 may be connected to a second ground portion G2. The conductive pattern 161 may be connected to the second ground portion G2 through a second ground connection circuit 1440. According to an embodiment, the second ground connection circuit 1440 may include a switch of controlling the connection between the conductive pattern 161 and the ground portion, a tunable device, and/or a matching device.

According to an embodiment of the disclosure, the second conductive portion 122 may be connected to a third ground portion G3. The third conductive portion 123 may be connected to a fourth ground portion G4.

According to an embodiment of the disclosure, the first conductive portion 121 may be connected to another component through a connection member. For example, the first conductive portion 121 may be connected to the first power feeding portion F1 through the connection member. For example, the connection member may be a C-clip, a pogo, or the like.

According to an embodiment of the disclosure, the electronic device 1400 may include a processor 1410 (e.g., AP or CP) and the communication circuit 1420 (e.g., the RFIC or the communication module 1990 of FIG. 19). The processor 1410 may be connected to the communication circuit 1420 and may control the communication circuit 1420 to transmit/receive a signal of a target frequency. For example, the processor 1410 may control the communication circuit 1420 such that the communication circuit 1420 transmits/receives a signal of a specific band by using the first conductive portion 121 or a signal of another frequency band by using the conductive pattern 161. The electronic device 1400 may transmit the signal received through the conductive pattern 161 and the first conductive portion 121 to mutually different communication modules (e.g., a cellular module or a Wi-Fi module) or may transmit signals from mutually different modules to an external device through the conductive pattern 161 and the first conductive portion 121.

According to an embodiment of the disclosure, the ground portion, the power feeding portion, the processor 1410, or the communication circuit 1420 may be arranged on a printed circuit board (e.g., the printed circuit board 17).

According to an embodiment of the disclosure, an electronic device (e.g., reference numeral 100 of FIGS. 1 to 3, reference numeral 400 of FIG. 4, reference numeral 500 of FIG. 5, reference numeral 600 of FIG. 6, reference numeral 700 of FIG. 7, reference numeral 800 of FIG. 8, reference numeral 900 of FIG. 9, reference numeral 1000 of FIG. 10, reference numeral 1100 of FIGS. 11A and 11B, reference numeral 1400 of FIG. 14, reference numeral 1500 of FIG. 15, reference numeral 1600 of FIGS. 16 and 17, or reference numeral 1900 of FIG. 19) may include a housing (e.g., reference numeral 110 of FIG. 1) including a front glass plate (e.g., reference numeral 140 of FIG. 9), a back glass plate (e.g., reference numeral 150 of FIG. 9), and a side member (e.g., reference numeral 120 of FIG. 9) surrounding a space between the front and back glass plates and including a conductive portion (e.g., reference numeral 121 of FIG. 9). The front glass plate may have a rectangular shape including a first side (e.g., reference numeral 140a of FIG. 2), a second side (e.g., reference numeral 140b of FIG. 2), a third side (e.g., reference numeral 140c of FIG. 2), and a fourth side (e.g., reference numeral 140d of FIG. 2) when viewed from above the front glass plate. The first and second sides may have lengths shorter than the third and fourth sides. The first side of the front glass plate may include a first edge portion (e.g., reference numeral 141 of FIG. 9) curved toward the back glass plate when viewed in cross-section cut in a direction perpendicular to the first side. In addition, the electronic device may include a touch screen display (e.g., reference numeral 13 of FIG. 9) exposed through a portion of the front glass plate, at least one first conductive pattern (e.g., reference numeral 162 of FIG. 1) positioned inside the housing and formed along an inner surface of the first edge portion, a wireless communication circuit (e.g., reference numeral 1420 of FIG. 14) positioned inside the housing and electrically connected to the conductive portion and the at least one first conductive pattern, and a processor (e.g., reference numeral 1410 of FIG. 14) electrically connected to the display and the wireless communication circuit.

According to an embodiment of the disclosure, the back glass plate may have a rectangular shape including a fifth side 150a, a sixth side 150b, a seventh side 150c, and an eighth side 150d when viewed from above the back glass plate. The fifth and sixth sides may have lengths shorter than the seventh and eighth sides. The fifth and sixth sides may correspond to the first and second sides, respectively. The fifth side may include a second edge portion (e.g., reference numeral 151 of FIG. 9) which is curved toward the front glass plate when viewed in cross-section cut in a direction perpendicular to the fifth side, and at least one second conductive pattern (e.g., reference numeral 161 of FIG. 9) positioned inside the housing and formed along an inner surface of the second edge portion.

According to an embodiment of the disclosure, the wireless communication circuit may be electrically connected to the at least one second conductive pattern.

According to an embodiment of the disclosure, the conductive portion may be adjacent to the first side of the front plate.

According to an embodiment of the disclosure, the conductive portion may be physically spaced apart from the first conductive pattern by an insulating material (reference numeral 124 of FIG. 9).

According to an embodiment of the disclosure, the conductive portion may be at least a portion of a metal frame arranged on the side member.

A printed circuit board (e.g., reference numeral 17 of FIG. 6) may be included in the housing, and the conductive portion may be electrically connected to a ground layer (e.g., reference numeral 18 of FIG. 8) located on the printed circuit board.

According to an embodiment of the disclosure, the ground layer may be electrically connected to a ground layer (e.g., reference numeral 19 of FIG. 8) located in the display.

According to an embodiment of the disclosure, a switch (e.g., reference numeral 1640 of FIG. 16) may be included to switch on or off an electric path through which the conductive portion is connected to the ground layer.

According to an embodiment of the disclosure, the switch may be connected to at least one of a capacitor (e.g., reference numeral 730c of FIG. 7) and an inductor (e.g., reference numeral 730d of FIG. 7).

According to an embodiment of the disclosure, a printed circuit board may be included inside the housing, and the at least one first conductive pattern may be electrically connected to the ground layer located on the printed circuit board.

According to an embodiment of the disclosure, a switch (e.g., reference numeral 1440 of FIG. 14) may be included to switch on or off an electric path through which the at least one conductive pattern is connected to the ground layer.

According to an embodiment of the disclosure, an electronic device (e.g., reference numeral 100 of FIGS. 1 to 3, reference numeral 400 of FIG. 4, reference numeral 500 of FIG. 5, reference numeral 600 of FIG. 6, reference numeral 700 of FIG. 7, reference numeral 800 of FIG. 8, reference numeral 900 of FIG. 9, reference numeral 1000 of FIG. 10, reference numeral 1100 of FIG. 11, reference numeral 1400 of FIG. 14, reference numeral 1500 of FIG. 15, reference numeral 1600 of FIGS. 16 and 17, or reference numeral 1900 of FIG. 19) may include a housing (e.g., reference numeral 110 of FIG. 1) including a first surface (e.g., reference numeral 111 of FIG. 1) facing a first direction, a second surface (e.g., reference numeral 112 of FIG. 1) facing the first surface, and a side member (e.g., reference numeral 120 of FIG. 9) arranged in a space between the first and second surfaces and including a conductive portion (e.g., reference numeral 121 of FIG. 9) extending along a portion of the side member. The housing may include a curved portion (e.g., reference numeral 113 of FIG. 9) which is formed from the first surface toward the side member when viewed in cross-section cut in a direction perpendicular to a portion of the side member, a conductive pattern (e.g., reference numeral 162 of FIG. 9) which is at least partially formed at least inside the curved portion along the conductive portion, an insulating material (e.g., reference numeral 124 of FIG. 9) which is arranged between the first surface and the side member to physically separate the conductive pattern from the conductive portion, and a wireless communication circuit (e.g., reference numeral 1420 of FIG. 14) which is located inside the housing to transmit an electrical signal to at least one of the conductive portion and the conductive pattern.

According to an embodiment of the disclosure, the electronic device may include a display exposed at least through the first surface, and the display may extend along the first surface such that the display is adjacent to the side member.

According to an embodiment of the disclosure, the conductive portion is electrically connected to the conductive pattern.

According to an embodiment of the disclosure, a switch (e.g., reference numeral 1640 of FIG. 16) may be included to switch on or off an electric path through which the conductive portion is connected to the conductive pattern.

According to an embodiment of the disclosure, the switch may be connected to at least one of a capacitor (e.g., reference numeral 730*a* of FIG. 7) or an inductor (e.g., reference numeral 730*d* of FIG. 7).

According to an embodiment of the disclosure, the conductive portion may provide power to the conductive pattern through coupling.

According to an embodiment of the disclosure, the electronic device may include a printed circuit board (e.g., reference numeral 17 of FIG. 6) inside the housing, and the conductive portion may be electrically connected to a ground layer (e.g., reference numeral 18 of FIG. 8) located on the printed circuit board.

Figure 15:
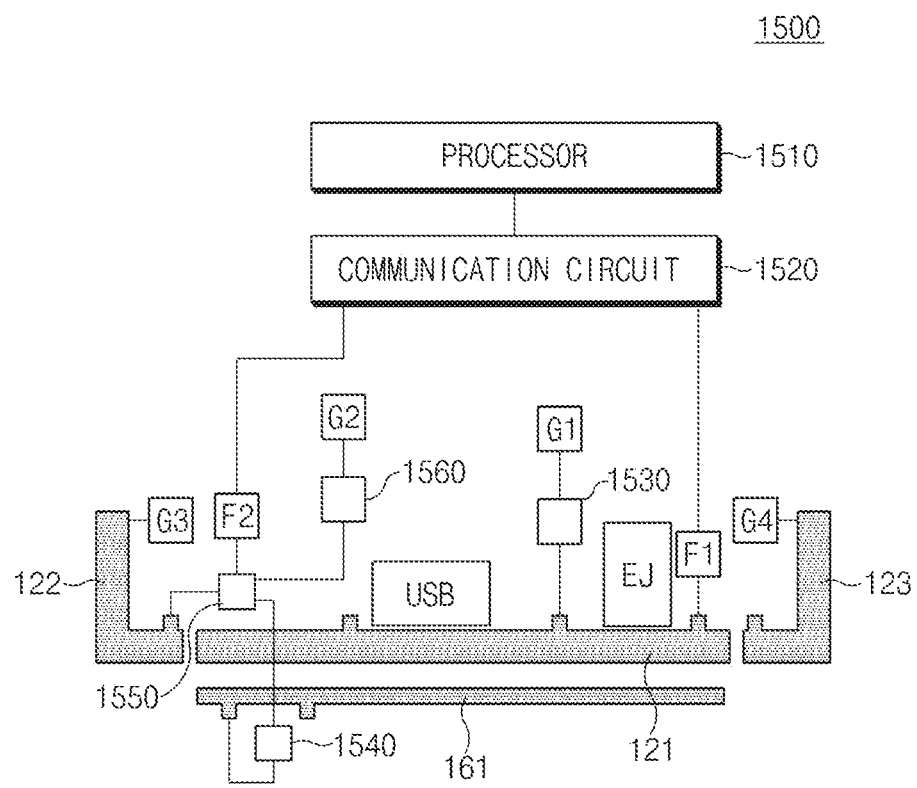
FIG. 15 is a view illustrating an antenna structure according to an embodiment of the disclosure.

FIG. 15 illustrates an antenna structure according to an embodiment of the disclosure.

Referring to FIG. 15, according to an embodiment of the disclosure, an electronic device 1500 may include the first conductive portion 121 (e.g., the first conductive portion 121 of FIG. 1), the second conductive portion 122 (e.g., the second conductive portion 122 of FIG. 1) or the third conductive portion 123 (e.g., the third conductive portion 123 of FIG. 1), or the conductive pattern 161 (e.g., the first conductive pattern 161 of FIG. 9). The electronic device 1500 may be the same as or similar to the electronic device 900 of FIG. 9 or the electronic device 1000 of FIG. 10. The conductive pattern 161 may be the same as or similar to the first conductive pattern 161.

Referring to FIG. 15, the electronic device 1500 may include a first antenna including the first conductive portion 121 (e.g., the first conductive pattern 161 of FIG. 9), and a second antenna including the conductive pattern 161 (e.g., the first conductive pattern 161 of FIG. 9) and/or the second conductive portion 122. The first and second antennas may operate independently of each other. For example, a communication circuit 1520 may transmit/receive signals of the same frequency band or mutually different frequency bands by using the first and second antennas.

According to an embodiment of the disclosure, when an electrical signal is provided to the first conductive portion 121, the first conductive portion 121 may operate as the first antenna. The first conductive portion 121 may be connected to a first power feeding portion F1. The communication circuit 1520 may transmit an electrical signal to the first conductive portion 121 through the first power feeding portion F1.

According to an embodiment of the disclosure, one point of the first conductive portion 121 may be connected to a first ground portion G1. The first conductive portion 121 may be connected to the first ground portion G1 through a first ground connection circuit 1530.

According to an embodiment of the disclosure, when power is supplied to the conductive pattern 161 and/or the second conductive portion 122, the conductive pattern 161 and/or the second conductive portion 122 may operate as the second antenna. The conductive pattern 161 and/or the second conductive portion 122 may be connected to a second power feeding portion F2 and a second ground portion G2.

According to an embodiment of the disclosure, the conductive pattern 161 and/or the second conductive portion 122 may be connected to the second power feeding portion F2 through a first power connection circuit 1550, and connected to the second ground portion G2 through a second ground connection circuit 1560.

According to an embodiment of the disclosure, the second antenna may selectively include the conductive pattern 161 and/or the second conductive portion 122. The electronic device 1500 may adjust a frequency of the second antenna by selecting a radiator constituting the second antenna.

According to an embodiment of the disclosure, the conductive pattern 161 and/or the second conductive portion 122 may be selectively connected to the second power feeding portion F2. The first power connection circuit 1550 may selectively connect the second power feeding portion F2 to the conductive pattern 161 and/or the second conductive portion 122.

According to an embodiment of the disclosure, the conductive pattern 161 and the second conductive portion 122 may be selectively connected to each other. The first power connection circuit 1550 may control the opening and closing of the electric path between the conductive pattern 161 and the second conductive portion 122. For example, when the conductive pattern 161 and the second conductive portion 122 may be connected to each other, an electrical length of the second antenna may be lengthened and the resonant frequency may be lowered.

According to an embodiment of the disclosure, the second ground connection circuit 1560 may selectively connect the second ground portion G2 and the conductive pattern 161 and/or the second conductive portion 122.

According to an embodiment of the disclosure, the conductive pattern 161 may be electrically connected to the first power connection circuit 1550 through a second power connection circuit 1540. The second power connection circuit 1540 may selectively connect the conductive pattern 161 to the first power connection circuit 1550 or may include a device configured to control the resonant frequency of the conductive pattern 161.

According to an embodiment of the disclosure, the first and second power connection circuits 1550 and 1540 may operate as a connection portion to constitute the second antenna including a radiator including at least one of the conductive pattern 161 or the second conductive portion 122, a ground portion, or a power feeding portion.

According to an embodiment of the disclosure, the second conductive portion 122 may be connected to the third ground portion G3. The third conductive portion 123 may be connected to the fourth ground portion G4.

According to an embodiment of the disclosure, the first ground connection circuit 1530 and/or the second ground connection circuit 1560 may include a switch and/or, a tunable circuit including at least one of an inductor and a capacitor.

According to an embodiment of the disclosure, at least one of the first and second power connection circuits 1550 and 1540 may include at least one of a switch, a tunable device and/or a matching device. A switch according to an embodiment may control the opening and closing of the electrical path or may select at least one of a plurality of points. For example, the first power connection circuit 1550 and/or the second power connection circuit 1540 may include a switch, such as a single pole 2 throw (SP2T) or a single pole 4 throw (SP4T), an inductor, a capacitor, and/or a wire connection portion arranged on a printed circuit board.

According to an embodiment of the disclosure, the electronic device 1500 may include a processor 1510 and the communication circuit 1520. The processor 1510 may control the communication circuit 1520 such that the communication circuit 1520 transmits/receives a signal of a target frequency band by using the first conductive portion 121, the second conductive portion 122 and/or the conductive pattern 161.

According to an embodiment of the disclosure, the first conductive portion 121 may be used to transmit/receive a signal in a low band (e.g., about 600 MHz to about 1000 MHz), a middle band (e.g., about 1700 MHz to about 2200 MHz), or a high band (e.g., about 2200 MHz to about 2700 MHz). According to an embodiment, at least the conductive pattern 161 may be used to transmit/receive a signal in a middle band.

According to an embodiment of the disclosure, the processor 1510 may be connected to a switch included in the first power connection circuit 1550 and/or the second power connection circuit 1540. The processor 1510 may control the switch based on various conditions, such as a channel state, an interference level, and the like.

According to an embodiment of the disclosure, the ground portion, the power feeding portion, the processor 1510, or the communication circuit 1520 may be arranged on a printed circuit board (e.g., the printed circuit board 17).

Although the second antenna selectively including the conductive pattern 161 and the second conductive portion 122 is illustrated in FIG. 15, the second antenna may be variously modified. For example, the second antenna may include a conductive pattern 162 (e.g., the second conductive pattern 162 of FIG. 9).

Figure 16:
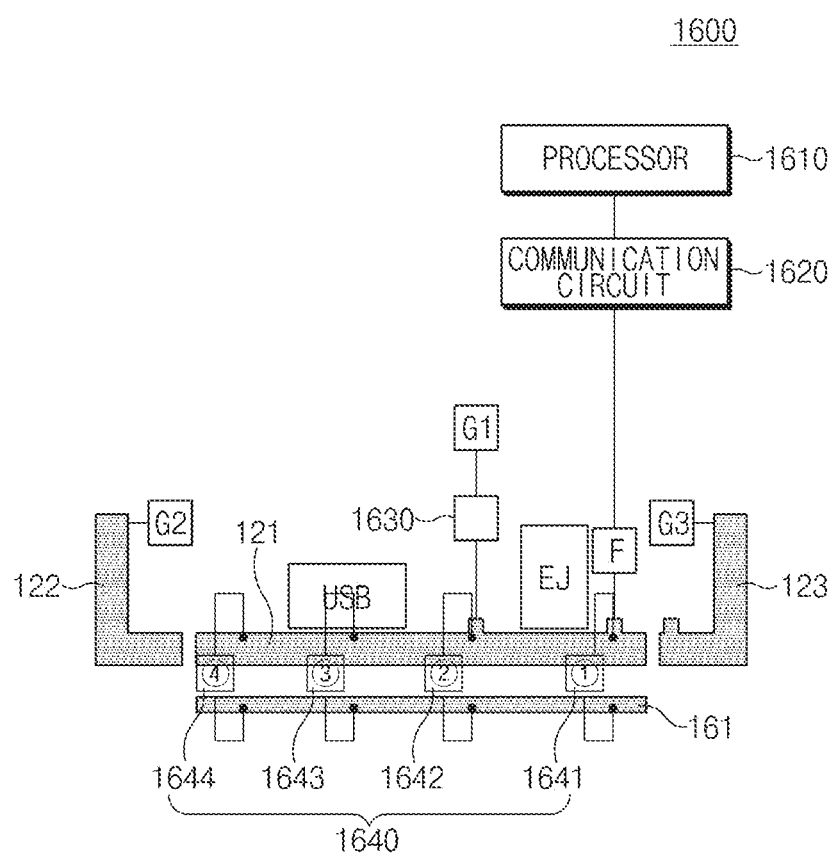
FIG. 16 is a view illustrating an antenna structure according to an embodiment of the disclosure.

FIG. 16 illustrates an antenna structure according to an embodiment of the disclosure.

Referring to FIG. 16, an electronic device 1600 may include the first conductive portion 121 (e.g., the first conductive portion 121 of FIG. 1), the second conductive portion 122 (e.g., the second conductive portion 122 of FIG. 1) or the third conductive portion 123 (e.g., the third conductive portion 123 of FIG. 1), or a conductive pattern 161 (e.g., the first conductive pattern 161 of FIG. 9). The electronic device 1600 may be the same as or similar to the electronic device 900 of FIG. 9 or the electronic device 1000 of FIG. 10.

Referring to FIG. 16, the electronic device 1600 may include an antenna including at least the first conductive portion 121. The electronic device 1600 may selectively connect to the first conductive portion 121 and the conductive pattern 161. The electronic device 1600 may selectively connect the first conductive portion 121 to the conductive pattern 161 through various electrical paths.

According to an embodiment of the disclosure, the first conductive portion 121 (e.g., the first conductive portion 121 in FIG. 9) may be electrically connected to the conductive pattern 161. The electronic device 1600 may connect the first conductive portion 121 to the conductive pattern 161 to secure an electrical length for transmitting/receiving a signal of a target frequency. When the first conductive portion 121 is connected to the conductive pattern 161, an electrical signal supplied to the first conductive portion 121 may be induced to the conductive pattern 161 such that the size of the radiator is enlarged.

According to an embodiment of the disclosure, the electronic device 1600 may further include a radiator connection circuit 1640 for connecting the first conductive portion 121 to the conductive pattern 161. According to an embodiment, the radiator connection circuit 1640 includes a switch for controlling the opening and closing of at least one electrical path between the first conductive portion 121 and the conductive pattern 162, a tunable device, and/or a matching device.

According to an embodiment of the disclosure, a power feeding portion F may be electrically connected to the first conductive portion 121. A communication circuit 1620 may transmit an electrical signal to the first conductive portion 121 through the power feeding portion F. When an electrical signal is transmitted to the first conductive portion 121, the first conductive portion 121 may operate as an antenna.

According to an embodiment of the disclosure, the electronic device 1600 may include at least one electrical path through which the first conductive portion 121 and the conductive pattern 161 are connected to each other. When the first conductive portion 121 and the conductive pattern 161 are connected to each other, a current is induced to the conductive pattern 161 such that the radiator may be expanded.

According to an embodiment of the disclosure, at least one electrical path may connect the first conductive portion 121 and the conductive pattern 161 to form various electrical paths. For example, at least one electrical path may include first to fourth electrical paths ① to ④. The first to fourth electrical paths may connect various connection points, respectively. As another example, the first to fourth electrical paths may be connected to at least one point of the first conductive portion 121 and may be connected to at least one point of the conductive pattern 161. For example, the first to fourth electrical paths may be connected to one point of the conductive pattern 161.

According to an embodiment of the disclosure, the at least one electrical path may be connected in various combinations. For example, the electronic device 1600 may connect only one electrical path or connect a plurality of electrical paths in various combinations at the same time. The first conductive portion 121 and the conductive pattern 161 may form various resonant frequencies depending on the connection manner of the electric path. For example, the first conductive portion 121 and the conductive pattern 161 may transmit/receive a wide band signal.

For example, when the fourth electrical path is connected, the antenna area may be enlarged to increase the antenna efficiency of the low band. When the first and fourth electrical paths are connected, the antenna radiator may be formed in a rectangular shape. When the first and fourth electrical paths are connected, slot resonance may be added and resonance in the middle band may be added, so that the frequency bandwidth of the antenna is expanded.

According to an embodiment of the disclosure, the first ground G1 may be electrically connected to the first conductive portion 121. The ground portion may be connected to the first conductive portion 121 and the antenna ground. The antenna ground may include at least a ground layer formed on the conductive layer of the printed circuit board.

According to an embodiment of the disclosure, the electronic device 1600 may include a first ground connection circuit 1630 for connecting the first ground portion G1 and the first conductive portion 121. The first ground connection circuit 1630 may selectively connect the first ground portion G1 and the first conductive portion 121 or may perform a frequency control function.

FIG. 16 illustrates the electrical path including the first to fourth electrical paths as an example, and the number of electrical paths connecting the first conductive portion 121 and the conductive pattern 162 and the positions may be variously modified.

According to an embodiment of the disclosure, the electronic device 1600 may include the radiator connection circuit 1640 for controlling the opening and closing of at least one electrical path. The radiator connection circuit 1640 may include at least one circuit for connecting an electrical path. The first electrical path may include a first radiator connection circuit 1641. The second electrical path may include a second radiator connection circuit 1642. The third electrical path may include a third radiator connection circuit 1643. The fourth electrical path may include a fourth radiator connection circuit 1644. For example, the first radiator connection circuit 1641 may connect a first point of the conductive portion 121 and a first point of the conductive pattern 161. The fourth radiator connection circuit 1644 may connect a fourth point of the conductive portion 121 and a fourth point of the conductive pattern 161.

According to an embodiment of the disclosure, at least one of the first to fourth radiator connection circuits 1641 to 1644 may include a switch for controlling the opening and closing of the electrical path. At least one of the first to fourth radiator connection circuits 1641 to 1644 may include a tunable device and/or a matching device.

The electronic device 1600 may include a processor 1610 and the communication circuit 1620.

According to an embodiment of the disclosure, the processor 1610 may be connected to the first to fourth radiator connection circuits 1641 to 1644. The processor 1610 may control at least one of the first to fourth radiator connection circuits 1641 to 1644 to secure an electrical length for transmitting/receiving a signal of a target frequency. For example, the processor 1610 may control such that the switches of the first and fourth electrical paths are closed when a signal in the middle band is transmitted/received.

According to an embodiment of the disclosure, the communication circuit 1620 may be electrically coupled to the radiator. For example, the communication circuit 1620 may be electrically connected to the conductive portion 121. A signal fed from the communication circuit 1620 to the conductive portion 121 may be radiated to an external space through the conductive portion 121 and/or the conductive pattern 161.

According to an embodiment of the disclosure, the conductive portion 121 may supply power to the conductive pattern 161 through coupling. In this case, all the first to fourth electrical paths may be opened.

Figure 17:
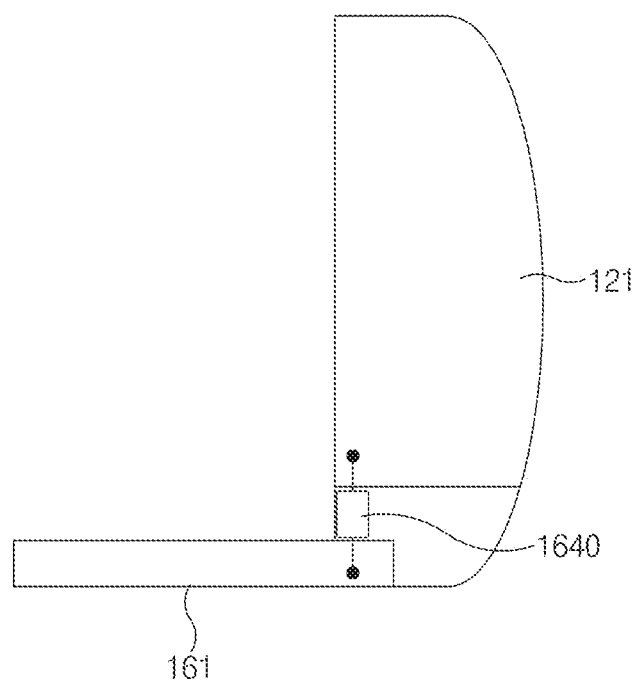
FIG. 17 is a view schematically illustrating a portion of an antenna including a conductive portion and a conductive pattern according to an embodiment of the disclosure.

FIG. 17 is a view schematically illustrating a portion of an antenna including a conductive portion and a conductive pattern according to an embodiment of the disclosure. FIG. 17 schematically illustrates the antenna configuration viewed from the right side of the electronic device 1600 of FIG. 16.

Referring to FIG. 17, according to an embodiment of the disclosure, the electronic device 1600 may include an antenna including the conductive portion 121 and/or the conductive pattern 161. According to an embodiment, the conductive portion 121 and the conductive pattern 161 may be electrically connected to each other. The conductive portion 121 and the conductive pattern 161 may be variously connected through one selected from a plurality of electrical paths. When the conductive pattern 161 is connected to the conductive portion 121, the radiator of the antenna may be more enlarged.

Although the conductive pattern 161 and the conductive portion 121 electrically connected to each other are illustrated in FIGS. 16 and 17, the conductive pattern 161 may be connected to various conductive portions formed in a housing (e.g., the housing 110 of FIG. 1).

Figure 18:
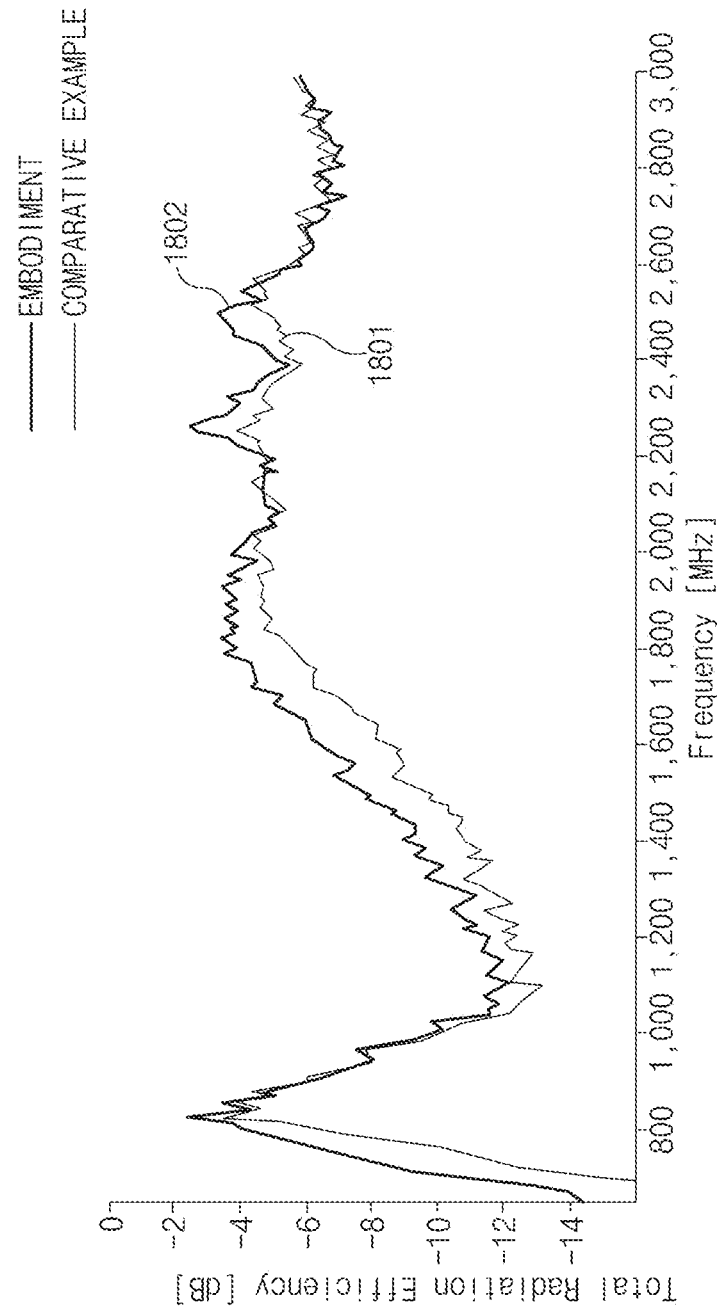
FIG. 18 is a graph illustrating a total radiation efficiency of an antennas according to an embodiment of the disclosure.

FIG. 18 is a graph illustrating a total radiation efficiency of antennas according to an embodiment of the disclosure.

Referring to FIG. 18, graph 1 1801 illustrates the total radiation efficiency of the antenna according to a comparative example in which a conductive portion (e.g., the first conductive portion 121 in FIG. 16) is not connected to a conductive pattern (e.g., the conductive pattern 162 in FIG. 16). Graph 2 1802 illustrates the total radiation efficiency of the antenna when the conductive portion is electrically connected to the conductive pattern according to the embodiment of FIG. 16. For example, according to an embodiment, at least one of the first or fourth electrical paths of FIG. 16 may be closed.

Referring to Graph 1 1801, the antenna using a conductive portion according to a comparative example may transmit/receive signals of a low band and a middle band. The antenna according to the comparative example resonates in a low band of about 810 MHz to about 860 MHz, and the radiation efficiency of the antenna is about −3.5 dB at the maximum. The antenna according to the comparative example resonates in a middle band of about 2200 MHz to about 2600 MHz, and the radiation efficiency of the antenna is about −4 dB at the maximum.

Referring to graph 2 1802, according to an embodiment, an antenna including a conductive portion and a conductive pattern resonates in a low band of about 810 MHz to about 860 MHz, and the radiation efficiency is about −2.3 dB at the maximum. The antenna according to an embodiment resonates in a first middle band of about 2200 MHz to about 2600 MHz, and the radiation efficiency is at the maximum about −2.5 dB higher than that of the antenna according to the comparative example. The antenna according to an embodiment may transmit/receive signals in a second middle band as well as the first middle band. Referring to graph 2 1802, the second middle band may be about 1800 MHz to about 2000 MHz. In the second middle band, the radiation efficiency of the antenna according to an embodiment is about −3.7 dB at the maximum.

According to an embodiment of the disclosure, when the display is enlarged on the front surface of the electronic device and an additional conductive pattern is connected to the conductive portion, the radiation efficiency may be higher than the case where only the conductive portion is used as the antenna. As another example, when an additional conductive pattern and the conductive portion are connected to each other and the radiation portion is formed in a rectangular shape, the radiation efficiency of the antenna in the middle band may be improved and the antenna may transmit/receive signals in the additional band.

Although the antenna including the conductive pattern 161 and the conductive portion 121 is illustrated in FIG. 18, the configuration of the antenna may be variously modified. For example, the antenna may include the conductive portion 121 and the conductive pattern 162 (e.g., the second conductive pattern 162 of FIG. 9).

FIG. 19 illustrates a block diagram of an electronic device in a network environment according to an embodiment of the disclosure.

An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or a motion picture experts group (MPEG-1 or MPEG-2) audio layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment of the disclosure, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 19, under a network environment 1900, an electronic device 1901 (e.g., the electronic device 100) may communicate with an electronic device 1902 through local wireless communication 1998 or may communication with an electronic device 1904 or a server 1908 through a network 1999. According to an embodiment, the electronic device 1901 may communicate with the electronic device 1904 through the server 1908.

According to an embodiment of the disclosure, the electronic device 1901 may include a bus 1910, a processor 1920 (e.g., the processor 710), a memory 1930, an input device 1950 (e.g., a micro-phone or a mouse), a display device 1960, an audio module 1970, a sensor module 1976, an interface 1977, a haptic module 1979, a camera module 1980, a power management module 1988, a battery 1989, a communication module 1990, and a subscriber identification module 1996. According to an embodiment, the electronic device 1901 may not include at least one (e.g., the display device 1960 or the camera module 1980) of the above-described elements or may further include other element(s).

The bus 1910 may interconnect the above-described elements 1920 to 1990 and may include a circuit for conveying signals (e.g., a control message or data) between the above-described elements.

The processor 1920 may include one or more of a central processing unit (CPU), an AP, a graphic processing unit (GPU), an image signal processor (ISP) of a camera or a CP. According to an embodiment, the processor 1920 may be implemented with a system on chip (SoC) or a system in package (SiP). For example, the processor 1920 may drive an operating system (OS) or an application to control at least one of another element (e.g., hardware or software element) connected to the processor 1920 and may process and compute various data. The processor 1920 may load a command or data, which is received from at least one of other elements (e.g., the communication module 1990), into a volatile memory 1932 to process the command or data and may store the result data into a nonvolatile memory 1934.

The memory 1930 may include, for example, the volatile memory 1932 or the nonvolatile memory 1934. The volatile memory 1932 may include, for example, a random access memory (RAM) (e.g., a dynamic RAM (DRAM), a static RAM (SRAM), or a synchronous DRAM (SDRAM)). The nonvolatile memory 1934 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1934 may be configured in the form of an internal memory 1936 or the form of an external memory 1938 which is available through connection only if necessary, according to the connection with the electronic device 1901. The external memory 1938 may further include a flash drive, such as compact flash (CF), secure digital (SD), micro secure digital (Micro-SD), mini secure digital (Mini-SD), extreme digital (xD), a multimedia card (MMC), or a memory stick. The external memory 1938 may be operatively or physically connected with the electronic device 1901 in a wired manner (e.g., a cable or a universal serial bus (USB)) or a wireless (e.g., Bluetooth) manner.

For example, the memory 1930 may store, for example, at least one different software element, such as a command or data associated with the program 1940, of the electronic device 1901. The program 1940 may include, for example, a kernel 1941, a library 1943, an application framework 1945 or an application program (interchangeably, "application") 1947.

The input device 1950 may include a microphone, a mouse, or a keyboard. According to an embodiment, the keyboard may include a keyboard physically connected or a virtual keyboard displayed through the display 1960.

The display 1960 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input, such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1901.

The audio module 1970 may convert, for example, from a sound into an electrical signal or from an electrical signal into the sound. According to an embodiment, the audio module 1970 may acquire sound through the input device 1950 (e.g., a microphone) or may output sound through an output device (not illustrated) (e.g., a speaker or a receiver) included in the electronic device 1901, an external electronic device (e.g., the electronic device 1902 (e.g., a wireless speaker or a wireless headphone)) or an electronic device 1906 (e.g., a wired speaker or a wired headphone) connected with the electronic device 1901.

The sensor module 1976 may measure or detect, for example, an internal operating state (e.g., power or temperature) of the electronic device 1901 or an external environment state (e.g., an altitude, a humidity, or brightness) to generate an electrical signal or a data value corresponding to the information of the measured state or the detected state. The sensor module 1976 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1976 may further include a control circuit for controlling at least one or more sensors included therein. According to an embodiment, the sensor module 1976 may be controlled by using the processor 1920 or a processor (e.g., a sensor hub) separate from the processor 1920. In the case that the separate processor (e.g., a sensor hub) is used, while the processor 1920 is in a sleep state, the separate processor may operate without awakening the processor 1920 to control at least a portion of the operation or the state of the sensor module 1976.

According to an embodiment of the disclosure, the interface 1977 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1978 may physically connect the electronic device 1901 and the electronic device 1906. According to an embodiment, the connector 1978 may include, for example, an USB connector, an SD card/MMC connector, or an audio connector (e.g., a headphone connector).

The haptic module 1979 may convert an electrical signal into mechanical stimulation (e.g., vibration or motion) or into electrical stimulation. For example, the haptic module 1979 may apply tactile or kinesthetic stimulation to a user. The haptic module 1979 may include, for example, a motor, a piezoelectric element, or an electric stimulator.

The camera module 1980 may capture, for example, a still image and a moving picture. According to an embodiment, the camera module 1980 may include at least one lens (e.g., a wide-angle lens and a telephoto lens, or a front lens and a rear lens), an image sensor, an image signal processor, or a flash (e.g., a light emitting diode or a xenon lamp).

The power management module 1988, which is to manage the power of the electronic device 1901, may constitute at least a portion of a power management integrated circuit (PMIC).

The battery 1989 may include a primary cell, a secondary cell, or a fuel cell and may be recharged by an external power source to supply power at least one element of the electronic device 1901.

The communication module 1990 may establish a communication channel between the electronic device 1901 and an external device (e.g., the first external electronic device 1902, the second external electronic device 1904, or the server 1908). The communication module 1990 may support wired communication or wireless communication through the established communication channel. According to an embodiment, the communication module 1990 may include a wireless communication module 1992 or a wired communication module 1994. The communication module 1990 may communicate with the external device through a first network 1998 (e.g., a wireless local area network, such as Bluetooth or infrared data association (IrDA)) or a second network 1999 (e.g., a wireless wide area network, such as a cellular network) through a relevant module among the wireless communication module 1992 or the wired communication module 1994.

The wireless communication module 1992 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the disclosure, "GPS" and "GNSS" may be interchangeably used.

According to an embodiment of the disclosure, when the wireless communication module 1992 supports cellar communication, the wireless communication module 1992 may, for example, identify or authenticate the electronic device 1901 within a communication network using the subscriber identification module (e.g., a SIM card) 1996. According to an embodiment, the wireless communication module 1992 may include a CP separate from the processor 1920 (e.g., an AP). In this case, the communication processor may perform at least a portion of functions associated with at least one of elements 1910 to 1996 of the electronic device 1901 in substitute for the processor 1920 when the processor 1920 is in an inactive (sleep) state, and together with the processor 1920 when the processor 1920 is in an active state. According to an embodiment, the wireless communication module 1992 may include a plurality of communication modules, each supporting only a relevant communication scheme among cellular communication, local wireless communication, or a GNSS communication.

The wired communication module 1994 may include, for example, include a local area network (LAN) service, a power line communication, or a plain old telephone service (POTS).

For example, the first network 1998 may employ, for example, Wi-Fi direct or Bluetooth for transmitting or receiving commands or data through wireless direct connection between the electronic device 1901 and the first external electronic device 1902. The second network 1999 may include a telecommunication network (e.g., a computer network, such as a LAN or a WAN, the Internet or a telephone network) for transmitting or receiving commands or data between the electronic device 1901 and the second electronic device 1904.

According to various embodiments of the disclosure, the commands or the data may be transmitted or received between the electronic device 1901 and the second external electronic device 1904 through the server 1908 connected with the second network 1999. Each of the first and second external electronic devices 1902 and 1904 may be a device of which the type is different from or the same as that of the electronic device 1901. According to various embodiments, all or a part of operations that the electronic device 1901 will perform may be executed by another or a plurality of electronic devices (e.g., the electronic devices 1902 and 1904 or the server 1908). According to an embodiment of the disclosure, in the case that the electronic device 1901 executes any function or service automatically or in response to a request, the electronic device 1901 may not perform the function or the service internally, but may alternatively or additionally transmit requests for at least a part of a function associated with the electronic device 1901 to any other device (e.g., the electronic device 1902 or 1904 or the server 1908). The other electronic device (e.g., the electronic device 1902 or 1904 or the server 1908) may execute the requested function or additional function and may transmit the execution result to the electronic device 1901. The electronic device 1901 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions, such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 1930).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments of the disclosure, at least a part of an apparatus (e.g., modules or functions thereof) or a method (e.g., operations) may be, for example, implemented by instructions stored in a computer-readable storage media (e.g., the memory 1930) in the form of a program module. The instruction, when executed by a processor (e.g., a processor 1920), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a front glass plate, a back glass plate, and a side member surrounding a space between the front and back glass plates and including a conductive portion, the front glass plate having:
      a rectangular shape including a first side, a second side, a third side and a fourth side when viewed from above the front glass plate,
      wherein the first and second sides have lengths shorter than lengths of the third and fourth sides, and
      wherein the first side of the front glass plate includes a first edge portion which is curved toward the back glass plate when viewed in cross-section cut in a direction perpendicular to the first side;
   a touch screen display exposed through a portion of the front glass plate;
   at least one first conductive pattern positioned inside the housing and formed along an inner surface of the first edge portion;
   a wireless communication circuit positioned inside the housing and electrically connected to the conductive portion and the at least one first conductive pattern; and
   a processor electrically connected to the touch screen display and the wireless communication circuit,
   wherein the touch screen display extends to at least one of the first side and the second side, and
   wherein the at least one first conductive pattern is arranged to reduce interference with the touch screen display.

2. The electronic device of claim 1
   wherein the back glass plate has a rectangular shape including a fifth side, a sixth side, a seventh side and a eighth side when viewed from above the back glass plate,
   wherein the fifth and sixth sides have lengths shorter than lengths of the seventh and eighth sides,
   wherein the fifth and sixth sides correspond to the first and second sides, respectively, and
   wherein the fifth side includes a second edge portion which is curved toward the front glass plate when viewed in cross-section cut in a direction perpendicular to the fifth side.

3. The electronic device of claim 2, further comprising:
   at least one second conductive pattern positioned inside the housing and formed along an inner surface of the second edge portion.

4. The electronic device of claim 3, wherein the wireless communication circuit is electrically connected to the at least one second conductive pattern.

5. The electronic device of claim 1, wherein the conductive portion is arranged adjacent to the first side of the front glass plate.

6. The electronic device of claim 1, wherein the conductive portion is physically spaced apart from the at least one first conductive pattern by an insulating material.

7. The electronic device of claim 1, wherein the conductive portion includes at least a portion of a metal frame arranged on the side member.

8. The electronic device of claim 1, further comprising:
   a printed circuit board inside the housing,
   wherein the conductive portion is electrically connected to a ground layer located on the printed circuit board.

9. The electronic device of claim 8, wherein the ground layer located on the printed circuit board is electrically connected to a ground layer located in the display.

10. The electronic device of claim 8, further comprising:
    a switch configured to switch on or off an electric path through which the conductive portion is connected to the ground layer located on the printed circuit board.

11. The electronic device of claim 10, wherein the switch is connected to at least one of a capacitor or an inductor.

12. The electronic device of claim 1, further comprising:
    a printed circuit board inside the housing,
    wherein the at least one first conductive pattern is electrically connected to a ground layer located on the printed circuit board.

13. The electronic device of claim 12, further comprising:
    a switch configured to switch on or off an electric path through which the at least one first conductive pattern is connected to the ground layer located on the printed circuit board.

* * * * *